(12) United States Patent
Vogel

(10) Patent No.: US 11,493,340 B2
(45) Date of Patent: Nov. 8, 2022

(54) SURVEYING INSTRUMENT AND METHOD OF CALIBRATING A SURVEY INSTRUMENT

(71) Applicant: Trimble Jena GmbH, Jena (DE)

(72) Inventor: Michael Vogel, Schleifreisen (DE)

(73) Assignee: Trimble Jena GmbH, Jena (DE)

( * ) Notice: Subject to any disclaimer, the term of this patent is extended or adjusted under 35 U.S.C. 154(b) by 189 days.

(21) Appl. No.: 16/601,412

(22) Filed: Oct. 14, 2019

(65) Prior Publication Data
US 2020/0263984 A1 Aug. 20, 2020

(30) Foreign Application Priority Data

Feb. 15, 2019 (EP) .................... 19157547

(51) Int. Cl.
*G01C 15/00* (2006.01)
*G01C 25/00* (2006.01)
*G01C 1/02* (2006.01)

(52) U.S. Cl.
CPC ......... *G01C 15/006* (2013.01); *G01C 25/005* (2013.01); *G01C 1/02* (2013.01)

(58) Field of Classification Search
CPC ...... G01C 15/006; G01C 25/005; G01C 1/02; G01C 15/004
See application file for complete search history.

(56) References Cited

U.S. PATENT DOCUMENTS

| | | | |
|---|---|---|---|
| 5,883,969 A | 3/1999 | Le Gouzouguec et al. | |
| 5,905,592 A | 5/1999 | Gohdo et al. | |
| 6,069,656 A | 5/2000 | Silver | |
| 6,133,998 A | 10/2000 | Monz et al. | |
| 10,917,601 B2 | 2/2021 | Glimm | |
| 2001/0050763 A1 | 12/2001 | Shirai | |
| 2004/0096095 A1 | 5/2004 | Watkins | |
| 2004/0208340 A1 | 10/2004 | Kirschner | |
| 2007/0104353 A1* | 5/2007 | Vogel ................ | G01C 15/00 382/106 |

(Continued)

FOREIGN PATENT DOCUMENTS

| | | |
|---|---|---|
| DE | 11 2012 007 096 T5 | 8/2015 |
| EP | 0 661 519 A1 | 7/1995 |

(Continued)

OTHER PUBLICATIONS

European Search Report for Application No. 18200906.8 dated Apr. 3, 2019, 10 pages.

(Continued)

*Primary Examiner* — Luke D Ratcliffe
(74) *Attorney, Agent, or Firm* — Kilpatrick Townsend & Stockton LLP

(57) ABSTRACT

A surveying instrument comprises a base; an alidade rotatable about a first axis relative to the base; and an optical measuring instrument having a measuring axis rotatable about a second axis relative to the alidade. A beam path can be provided for a light beam using components including a light source, lenses, mirrors, beam splitters, and a position-sensitive detector. The surveying can be calibrated by performing plural measurements at different orientations of the alidade relative to the base and different orientations of the measuring instrument relative to the alidade using the above components.

21 Claims, 12 Drawing Sheets

(56) References Cited

U.S. PATENT DOCUMENTS

| | | | |
|---|---|---|---|
| 2008/0116354 A1 | 5/2008 | Kirschner et al. | |
| 2010/0012765 A1 | 1/2010 | Solenne | |
| 2010/0037474 A1* | 2/2010 | Hertzman | G01C 15/002 |
| | | | 33/290 |
| 2010/0253931 A1* | 10/2010 | Meier | G01B 11/002 |
| | | | 33/1 H |
| 2011/0228099 A1 | 9/2011 | Rakes | |
| 2013/0003069 A1 | 1/2013 | Umeda et al. | |
| 2014/0009604 A1* | 1/2014 | Hinderling | G01S 17/86 |
| | | | 348/142 |
| 2014/0307252 A1 | 10/2014 | Hinderling et al. | |
| 2015/0092180 A1 | 4/2015 | Nishita | |
| 2015/0177382 A1 | 6/2015 | Vogel et al. | |
| 2017/0168142 A1 | 6/2017 | Kumagai et al. | |
| 2018/0176492 A1 | 6/2018 | Bamji et al. | |
| 2020/0124417 A1 | 4/2020 | Vogel | |
| 2020/0124730 A1 | 4/2020 | Vogel | |
| 2020/0128201 A1 | 4/2020 | Glimm | |
| 2020/0166340 A1* | 5/2020 | Hinderling | F16M 11/18 |
| 2020/0263984 A1 | 8/2020 | Vogel | |
| 2020/0263986 A1 | 8/2020 | Vogel | |

FOREIGN PATENT DOCUMENTS

| | | |
|---|---|---|
| EP | 1 411 371 A1 | 4/2004 |
| EP | 1 422 498 A2 | 5/2004 |
| EP | 1 514 076 A1 | 3/2005 |
| EP | 1 681 533 A1 | 7/2006 |
| EP | 1 767 960 B1 | 10/2008 |
| EP | 2 103 905 A2 | 9/2009 |
| EP | 2 275 775 A2 | 1/2011 |
| EP | 2 408 192 A2 | 1/2012 |
| EP | 2 259 569 B1 | 6/2012 |
| EP | 2 706 376 A1 | 3/2014 |
| EP | 2 722 645 A2 | 4/2014 |
| EP | 2 789 972 A1 | 10/2014 |
| EP | 2 881 757 A1 | 6/2015 |
| EP | 2 889 576 A1 | 7/2015 |
| EP | 2 998 698 A1 | 3/2016 |
| EP | 3 130 888 A1 | 2/2017 |
| EP | 3 165 876 A2 | 5/2017 |
| EP | 3 173 816 A2 | 5/2017 |
| EP | 3 199 913 A1 | 8/2017 |
| WO | 98/10255 A1 | 3/1998 |
| WO | 99/34235 A1 | 7/1999 |
| WO | 2007/079600 A1 | 7/2007 |
| WO | 2007/118478 A1 | 10/2007 |
| WO | 2013/037848 A1 | 3/2013 |
| WO | 2014/195020 A1 | 12/2014 |
| WO | 2015/017539 A1 | 2/2015 |
| WO | 2015/136099 A2 | 9/2015 |
| WO | 2016/008513 A1 | 1/2016 |

OTHER PUBLICATIONS

European Search Report for Application No. 19155706.5 dated Jul. 10, 2019, 11 pages.

European Search Report for Application No. 18200908.4, dated Jun. 25, 2019, 20 pages.

U.S. Appl. No. 16/595,158 Notice of Allowance dated Oct. 5, 2020, 11 pages.

Topcon, DS Direct Aiming Station, White Paper; Topconcorporation: "White Paper WhitePaperforTopconDSeriesAutomaticAimingTotalStations X-pointingTechnology", Mar. 4, 2015; Doc. ID: WP-P-180-2TE; 5 pages, downloaded from the Internet Oct. 25, 2019 at http://www.topconcare.com/files/2013/7525/6386/DS_WP_P-180-2_TE.pdf.

Topcon, DS Series, Direct Aiming Station, White Paper; Topcon: "Compact Robotic Total Station designed to be both versatile and agile", Jan. 1, 2014, 4 pages, downloaded from the Internet Oct. 25, 2019 at http://www.topconcare.com/files/2013/7525/6386/DS_WP_P-180-2_TE.pdf.

Callenberg, C. et al., "Snapshot Difference Imaging using Time-of-Flight Sensors," ACM Transaction on Graphics, vol. 36, No. 6, Nov. 20, 2017, 10 pages.

U.S. Appl. No. 16/568,060 Final Office Action dated Apr. 26, 2022, 8 pages.

U.S. Appl. No. 16/829,992 Non-Final Office Action dated Jun. 10, 2022, 10 pages.

U.S. Appl. No. 16/567,723 Notice of Allowance dated Jul. 21, 2022, 18 pages.

U.S. Appl. No. 16/568,060 Notice of Allowance dated Aug. 5, 2022, 5 pages.

* cited by examiner

SURVEYING INSTRUMENT AND METHOD OF CALIBRATING A SURVEY INSTRUMENT

CROSS-REFERENCE TO RELATED APPLICATIONS

The present application claims priority to EP Application No. 19 157 547.1, filed Feb. 15, 2019, the contents of which are incorporated herein by reference in their entirety for all purposes.

FIELD

The present invention relates to surveying instruments and methods of calibrating surveying instruments.

BACKGROUND

A surveying instrument typically comprises a base, an alidade rotatable about a first axis relative to the base, and an optical measuring instrument having a measuring axis rotatable about a second axis relative to the alidade. The base is used for mounting the instrument on the ground, a floor, a wall, or any other object and may include, for example, a tripod. The base defines the first axis about which the alidade is rotatable relative to the base. Typically, the base is mounted such that the first axis is orientated in the vertical direction. The alidade defines the second axis about which the optical measuring instrument is rotatable relative to the alidade. Typically, the first and second axes are orthogonal to each other. The optical instrument defines the measuring axis which is an axis of the measuring instrument along which a measurement can be performed using the optical instrument. For example, the optical measuring instrument can be of a type emitting a laser beam along the measuring axis and detecting laser light of the beam reflected from an object in order to determine the distance between the object and the optical measuring instrument. The measuring axis and the second axis are typically orientated orthogonal to each other.

The measuring instrument may comprise rotational encoders measuring the rotational positions of the alidade about the first axis relative to the base and of the optical measuring instrument about the second axis relative to the alidade. It is then possible to determine the orientation of the measuring axis in a coordinate system defined relative to the base such that the measurement performed along the measuring axis can be associated with this coordinate system.

The orientation of the measuring axis in the coordinate system can be determined by a calculation using the orientation of the first axis in the coordinate system, the measured orientation of the alidade about the first axis relative to the base and the measured orientation of the measuring instrument about the second axis relative to the alidade as inputs. The calculation further depends on the angle between the first axis and the second axis and the angle between the second axis and the measuring axis. These angles are defined by the mechanical structure of the surveying instrument, and surveying instruments are typically designed such that these angles amount to 90°. However, these angles deviate from the angles which are expected according to the design of the instrument due to mechanical imperfections, and these angles may change over time due to influences from the environment, such as changing temperatures.

There are known methods of calibrating a surveying instrument in which the angles mentioned above, or the deviations of these angles from the angles expected based on the design of the surveying instrument, can be measured using a dedicated measuring setups external to the surveying instrument. Typically, such calibration methods are performed in a factory, a site operated by a supplier of the measuring instrument, or a site of a user of the measuring instrument, provided that he has the necessary additional tools available. These methods may provide an accurate calibration but consume significant amounts of time and/or resources since the instrument must be brought to the site where the calibration can be done or the necessary tools must be purchased. Moreover, these methods do not provide estimates of temporal changes of the errors occurring in the field during a surveying excursion subsequent to a most recent calibration.

Therefore, it is desirable to provide a method of calibrating a surveying instrument and a surveying instrument facilitate the calibration of the surveying instrument.

SUMMARY

The present invention has been accomplished taking the above considerations into account.

Thus, it is an object of the present invention to provide an improved method of calibrating a surveying instrument, and to provide an improved surveying instrument capable of performing a method of calibration.

Embodiments of the present invention provide methods for calibrating a surveying instrument which comprises a base, an alidade rotatable about a first axis relative to the base, and an optical measuring instrument having a measuring axis rotatable about a second axis relative to the alidade. The first and second axes can be substantially orthogonal to each other, but this is not required. Similarly, the measuring axis and the second axis can be substantially orthogonal to each other, but this is also not required.

The surveying instrument can be a surveying instrument of any type having a measuring axis. Examples of such surveying instruments include those known as a theodolite, a tachymeter, a total station, a scanner, a laser range finder and a dumpy level in the art, for example.

According to exemplary embodiments, the surveying instrument is configured such that a beam path for a light beam is provided using components such as, for example, a light source for emitting the light beam, zero or more lenses for collimating the light beam, zero or more mirrors for folding the beam path, zero or more beam splitters and a position sensitive detector for detecting light of the light beam. The light source can be fixed to the base, the alidade or the optical measuring instrument. The detector can be fixed to the base, the alidade or the optical measuring instrument. The beam path extends between one of the components fixed to the base and one of the components fixed to the optical measuring instrument. This portion of the beam path can be provided such that the light beam extends between the one component and the other component directly, without traversing any further component, such as a lens, a beam splitter and a mirror, or this portion of the beam path may traverse further components, such as lenses, beam splitters and mirrors which influence the light beam traveling along the beam path by focusing, splitting, and folding, respectively.

The provided beam path between the light source and the detector includes the portion extending between the component fixed to the base and the component fixed to the measuring instrument, and it may include further portions upstream or downstream of this particular portion. Again, these further portions of the beam path can be defined using other components, such as lenses, beam splitters and mirrors, mounted on the base, the alidade and the optical measuring instrument.

According to further exemplary embodiments, the surveying instrument is configured such that the beam path between the one component fixed to the base and the other component fixed to the optical measuring instrument exists for at least a first range of rotational positions of the optical measuring instrument about the second axis. This means that it is not required that the beam path exists for all possible orientations of the optical measuring instrument about the second axis.

According to exemplary embodiments herein, the beam path further exists for a second range of rotational positions of the optical measuring instrument about the second axis, wherein the second range is different from the first range. For example, the orientation of the measuring instrument relative to alidade has to be changed by more than $\pi/10$ or $\pi/2$ between a first orientation in which the measuring instrument is orientated at the center of the first range and a second orientation at which the measuring instrument is orientated at the center of the second range. In such embodiments, the beam path is not required to exist for orientations other than orientations within the first and second ranges. However, the beam path may also exist for other orientations outside the first and second ranges.

According to further embodiments, the beam path exists for at least two or at least three different ranges of orientations of the alidade relative to the base about the first axis. Again, centers of the these two or three or more different ranges of orientations may differ by more than $\pi/10$ or more than $\pi/2$.

According to exemplary embodiments, a method of calibrating a surveying instrument comprises using a surveying instrument comprising a base, an alidade rotatable about a first axis relative to the base, and an optical measuring instrument having a measuring axis rotatable about a second axis relative to the alidade, and performing plural measurements, wherein each measurement includes detecting, using the detector, light of the light beam traveling from the light source along the beam path to the detector when the alidade is in a given rotational position about the first axis and the optical instrument is in a given rotational position about the second axis.

According to exemplary embodiments, at least one error of the surveying instrument is determined based on the plural measurements. The at least one error of the surveying instrument represents a deviation of an actual property of the surveying instrument from a corresponding expected property of the surveying instrument.

According to some embodiments, the determined at least one error includes a deviation of the angle between the first axis and the second axis from the expected angle between the first axis and the second axis. This error is referred to as the trunnion axis error in the art.

According to further exemplary embodiments, the at least one error includes a deviation of an angle between the measuring axis and the second axis and an expected angle between the measuring axis and the second axis. This error is referred to as collimation error in the art.

According to further exemplary embodiments the at least one error includes a difference between the orientation which is orthogonal to the first axis and the orientation of the measuring axis when it is expected to be orientated orthogonal to the first axis. This error is referred to as vertical index error in the art.

According to further exemplary embodiments, the surveying instrument comprises a base; an alidade rotatable about a first axis relative to the base; and an optical measuring instrument rotatable about a second axis relative to the alidade; wherein the optical measuring instrument is configured to emit a beam of measuring light along a measuring axis of the optical measuring instrument; wherein the optical measuring instrument comprises a position-sensitive detector and optics to image a distant object onto the detector; wherein the surveying instrument comprises a mirror fixed to the base; and wherein the optical measuring instrument can be oriented such that the beam of measuring light is reflected from the mirror fixed to the base such that it is incident on the detector of the optical measuring instrument.

According to further exemplary embodiments, a method of calibrating such surveying instrument comprises performing plural measurements at different rotational positions of the alidade about the first axis and plural rotational positions of the optical measuring instrument about the second axis, wherein, in each of the plural measurements, the optical measuring instrument is oriented such that the beam of measuring light is reflected from a mirror fixed to the base and incident on the detector; and determining at least one property of a coordinate transformation between a coordinate system of the detector and a coordinate system of the surveying instrument based on the plural measurements.

According to some particular embodiments, the at least one property of the coordinate transformation between a coordinate system of the detector and the coordinate system of the surveying instrument includes data representing a position on the detector onto which a location of the distant object is imaged where the measuring light beam is incident on the distant object.

When the surveying instrument is used, the optical measuring instrument is oriented such that the measuring light beam points to a desired location on the distant object, and the measuring light beam can be used to perform a measurement, such as to determine the distance of the selected location from the surveying instrument. In order to orient the optical measuring instrument such that such that the measuring light beam points to the desired location of the distant object, the image of the object recorded using the detector can be monitored. The image may include a representation of a reticle or similar element indicating the position in the image corresponding to the location on the distant object onto which the measuring light beam is directed. For this purpose, it is desirable that the position in the image indicated by the reticle exactly corresponds to the location on the distant object onto which the measuring light beam is directed. The above method can be helpful to establish this correspondence. In particular, the method allows to determine a pixel of the detector onto which the location of the distant object is imaged onto which the beam of measuring light is directed. This pixel is also referred to as the center pixel of the detector in the art.

BRIEF DESCRIPTION OF THE DRAWINGS

The forgoing as well as other advantageous features of this disclosure will be more apparent from the following detailed description of exemplary embodiments with reference to the accompanying drawings, in which.

DETAILED DESCRIPTION OF EXEMPLARY EMBODYMENTS

Figure 1A:
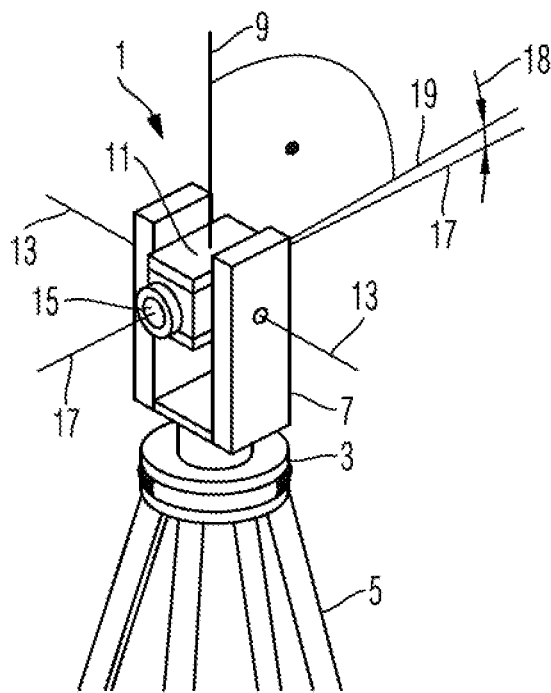
FIGS. 1A to 1D illustrate various errors of surveying instruments.

In the exemplary embodiments described below, components that are alike in function and structure are designated as far as possible by like reference numerals. Therefore, to understand the features of the individual components of a specific embodiment, the descriptions of other embodiments and of the summary of the invention should be referred to.

FIGS. 1A to 1D are schematic illustrations of an exemplary surveying instrument wherein each figure illustrates a certain type of axis error of the surveying instrument 1. The surveying instrument 1 is a theodolite in the illustrated example. The surveying instrument 1 comprises a base 3 which includes a tripod 5, and an alidade 7 which is rotatable relative to the base 3 about a first axis 9. In most surveying scenarios, it is desired that the first axis 9 is orientated vertically and the tripod 5 is used to adjust the orientation of the base 3 such that the first axis 9 is parallel to the vertical direction defined by the gravity vector at the location of the instrument 1. The surveying instrument 1 further comprises an optical measuring instrument 11 which is mounted on the alidade 7 such that it is rotatable relative to the alidade 7 about a second axis 13. The illustrated surveying instrument is designed such that the second axis 13 is orientated orthogonally to the first axis 9. The measuring instrument includes optics 15, such as a telescope, defining a measuring axis 17 along which a measurement can be performed using the optical measuring instrument 11. For example, the measuring axis 17 can be indicated by a reticle in the visual field of the telescope, and the user can direct the measuring axis 17 to an object of interest in the visual field of the telescope by rotating the measuring instrument 11 about the second axis 9 and the alidade 7 about the first axis 9. The user can then determine the orientations about the first and second axes 9, 13 by reading scales provided on the instrument or electronic signals generated by encoders associated with the first and second axes 9, 13 in the surveying instrument 1. Based on these readings, an angular position of the object of interest can be determined relative to a coordinate system associated with the base 3. The calculation of this orientation depends on the readings of the rotational positions about the first and second axes 9, 13 as inputs. The calculation further depends on assumptions on the geometry of the surveying instrument 1. The assumptions on the geometry include the orientations of the first axis, the second axis and the measuring axis relative to each other. If the configuration of the surveying instrument 1 deviates from these assumptions, this will result in an inaccurate calculation of the orientation of the measuring axis in the coordinate system.

FIG. 1A illustrates one type of such error, known as the vertical index error in the art. The vertical index error is indicative of an angle 18 between a line 19 which is exactly orthogonal to the first axis 9 and the measuring axis 17 when the measuring instrument 11 is orientated relative to the alidade 7 such that the angle between the first axis 9 and the measuring axis 17 should be 90° according to a scale provided on the instrument or the readings of the encoder associated with the rotation of the measuring instrument 11 about the second axis 13, assuming that the reading of the encoder or scale is at 0° when the measuring instrument is orientated such the measuring axis 17 is orientated upwards, pointing to the zenith.

Figure 1B:
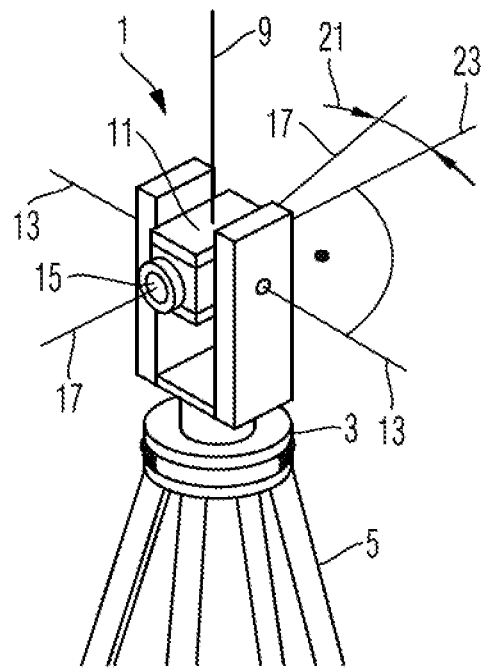

FIG. 1B illustrates a type of error which is known as the collimation error in the art. This error is indicative of an angle 21 between an axis 23 which is orthogonal to the second axis 13 and the measuring axis 17.

Figure 1C:
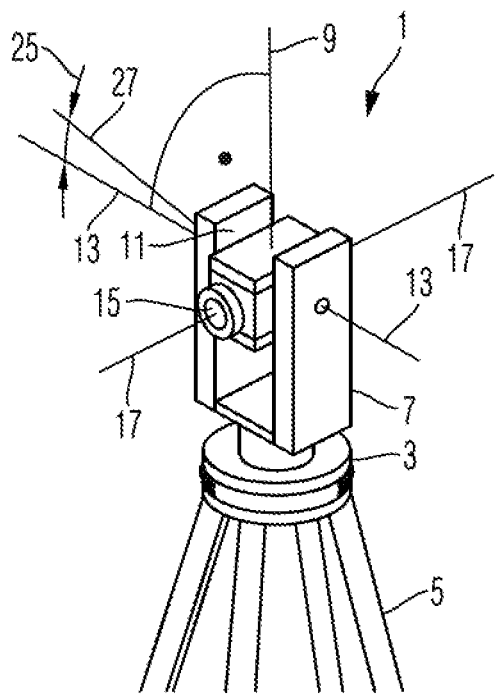

FIG. 1C illustrates a type of error known as the trunnion axis error in the art. This error is indicative of an angle 25 between the second axis 13 and a direction 27 which is exactly orthogonal to the first axis 9.

Figure 1D:
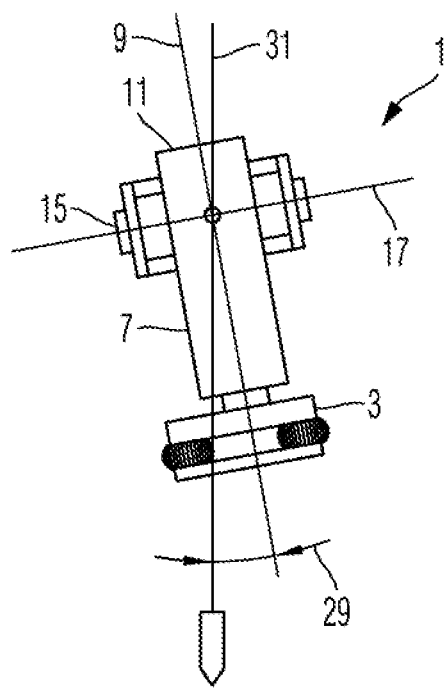

FIG. 1D illustrates an error known as the tilting axis error in the art, which is indicative of an angle 29 between the second axis 9 and the vertical direction 31 as defined by gravity at the location of the instrument 1.

The tilting axis error is a set-up error introduced by the user when mounting the instrument 1 and cannot be eliminated by a calibration of the instrument itself. The other three errors, the vertical index error, the collimation error, and the trunnion axis error depend only on the configuration of the surveying instrument 1 itself and are errors intrinsic to the instrument. The embodiments of calibration methods illustrated below seek to determine these or other types of errors of a surveying instrument.

Figure 2:
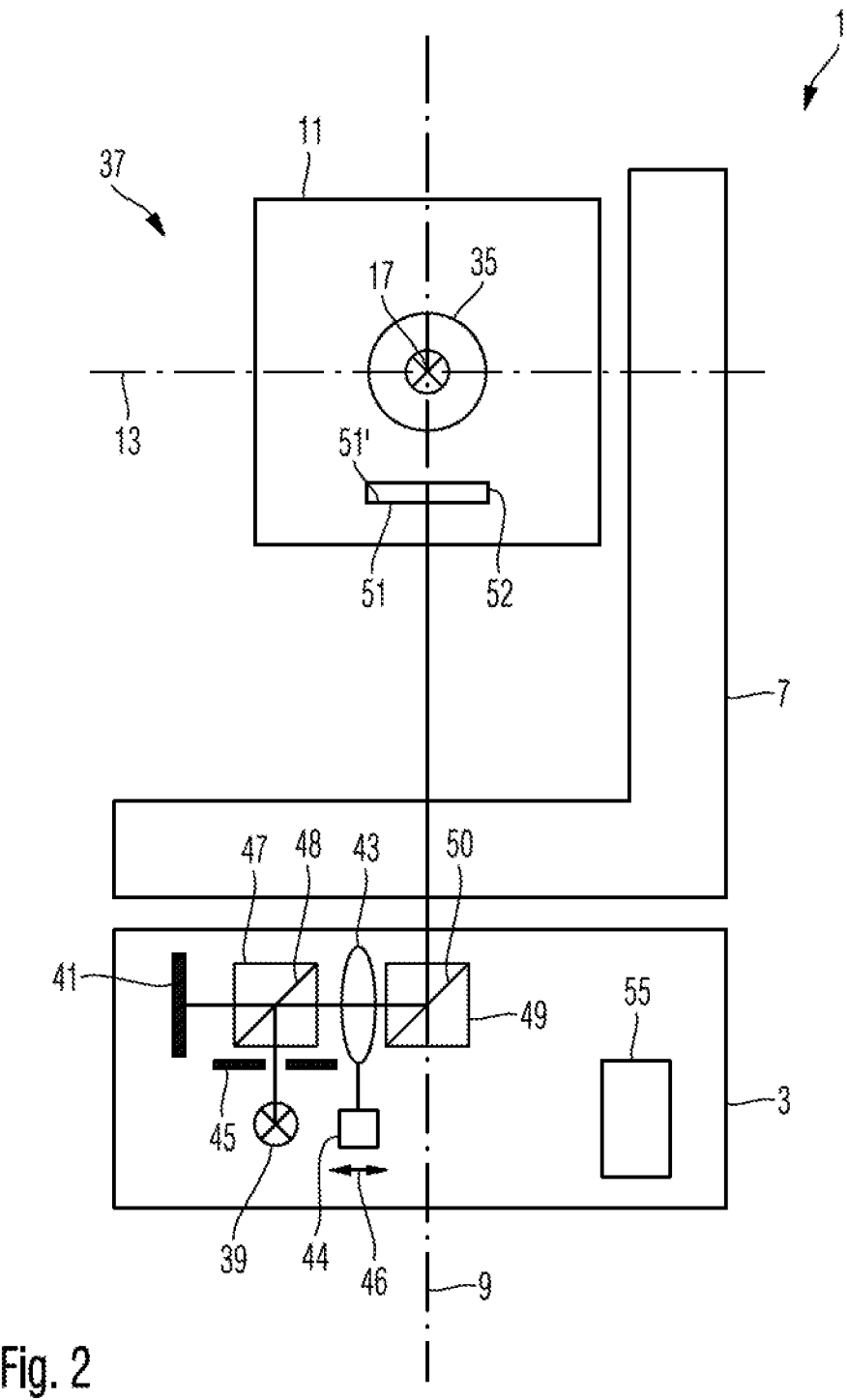
FIG. 2 schematically illustrates a surveying instrument according to a first embodiment in a first orientation of an optical measuring instrument relative to an alidade.

FIG. 2 is a schematic illustration of a surveying instrument 1. The surveying instrument 1 comprises a base 3 and an alidade 7 which is mounted on the base 3 such that it is rotatable relative to the base 3 about a first axis 9. The surveying instrument 1 further comprises an optical measuring instrument 11 which is mounted on the alidade 7 such that it is rotatable about a second axis 13 relative to the alidade 7. The second axis 13 is substantially orthogonal to the first axis 9. The measuring instrument 11 includes optics, such as a telescope, which is schematically represented by a front lens 35 in FIG. 2. The optics mounted on the measuring instrument defines a measuring axis 17 which is substantially orthogonal to the second axis 13. In the illustration of FIG. 2, the measuring instrument 11 is further orientated about the second axis 13 relative to the alidade 7 such that the measuring axis 17 is orthogonal to the first axis 9 and the plane of the drawing.

The surveying instrument 1 further comprises a calibration system 37 which can be used to determine properties of the surveying instrument 1. These properties may in particular include information on the relative orientations of the first axis 9, the second axis 13 and the measuring axis 17.

The calibration system 37 comprises optical components providing a beam path between a light source 5 and a detector 41. The optical components may include, apart from the light source 39 and the detector 41, lenses, mirrors and beam splitters or other suitable optical components which can be used to provide a suitable beam path between the light source 31 and the detector 41. In the embodiment illustrated in FIG. 2, the light emitted from the light source 39 traverses a pinhole 45 including a plate having a small opening such that a divergent beam of light is formed downstream of the pinhole 45. This beam is collimated by a lens 43.

It is to be noted that other components, such as a light emitting diode (LED), can be used to produce the divergent beam of light instead of the shown combination of the light source 39 and the pin hole 45.

Moreover, the calibration system 37 comprises an actuator 44 controlled by the controller 55 and configured to displace the collimating lens 43 in a direction of its optical axis as indicated by arrow 46 in FIG. 2. The actuator 44 can be controlled in order to adjust the collimation of the beam generated from light source 39 and to adjust a focus generated on the detector 41 from an incoming beam.

The light beam is subsequently incident on a beam splitter 47 from which a portion of the light beam is reflected. The portion of the light beam reflected from the beam splitter 47 is incident on a beam splitter 49 having a mirror surface 50 reflecting the light beam. The mirror surface 50 is positioned such that the first axis 9 intersects the mirror surface 50, and it is orientated such that the light beam reflected from the mirror surface 50 travels in a direction substantially parallel to the first axis 9. The light beam reflected from the mirror surface 50 traverses the alidade 7 and is incident on a mirror surface 51 provided on a mirror 52. For example, the mirror 52 can be provided by a glass plate having two parallel main surfaces, wherein one surface carries a metal layer. The metal layer has two opposite reflective surfaces 51 and 51' wherein light beam is reflected from the reflective surface 51 in the situation shown in FIG. 2. The mirror 52 is fixed to the measuring instrument 11 such that it has a fixed mechanical position and orientation relative to the measuring axis 17.

The light of the light beam incident on the mirror 52 and reflected from the mirror surface 51 travels back to the beam splitter 49 where it is reflected from the mirror surface 50 such that it is directed to the beam splitter 47, traversing the collimation lens 43. A portion of this light traverses the beam splitter 47 without being reflected such that it is incident on the detector 41. The detector 41 is arranged at a same distance from the collimation lens 43 as the pin hole 45 such that the beam is substantially focused on the detector 41.

The illustrated beam path of the light beam from the light source 39 to the detector 41 comprises plural portions: a portion between the light source 39 and the beam splitter 47, a portion extending from the beam splitter 47 to the beam splitter 49 mounted on the base 3, a portion extending from the beam splitter 49 to the mirror 52 mounted on the optical measuring instrument 11, a portion extending from the mirror 52 mounted on the measuring instrument 11 to the beam splitter 49 mounted on the base 3, a portion extending from the beam splitter 49 to the beam splitter 47, and a portion extending from the beam splitter 47 to the detector 41.

The detector 41 is a position sensitive detector such that a position at which the light beam is focused on the detector 41 can be determined from signals generated by the detector 41. According to some embodiments, the detector 41 comprises an array of detector pixels wherein each detector pixel provides a light detector. The position of the incident light beam on the detector can be determined from detection signals generated by the array of detector pixels. For example, the light beam can be simultaneously incident on plural detector pixels. The determination of the position of the light beam on the detector may include a determination of a center of gravity of the light intensity incident on the detector 41 and detected by the detector 41. The surveying instrument 1 may include a controller 55 including a calculator, such as a microcomputer, analyzing the detection signals generated by the detector and generating light position data representing the position on the detector 41 where the light beam is incident on the detector 41. The light position data can be generated based on the center of gravity of the detected light intensity as illustrated above.

The beam path having at least one portion extending between a component mounted on the base 3, which is the beam splitter 49 in the illustrated example, and a component mounted on the measuring instrument 11, which is the mirror 52 in the illustrated example, exists for plural rotational positions of the measuring instrument 11 relative to the alidade 7 about the second axis 13, and for plural rotational positions of the alidade 7 relative to the base 3 about the first axis 9.

In practice, the surface of the mirror 51 is not perfectly orthogonal to the first axis 9, and the light beam incident on the mirror 52 is not perfectly aligned with the first axis 9. Therefore, the positions of incidence of the light beam on the detector 41 will be arranged on a circle when the alidade 7 is rotated about the first axis 9.

Moreover, when the optical measuring instrument 11 is rotated about the second axis 13, the positions of incidence of the light beam on the detector 41 will be arranged on a substantially straight line on the detector 41.

Figure 3:
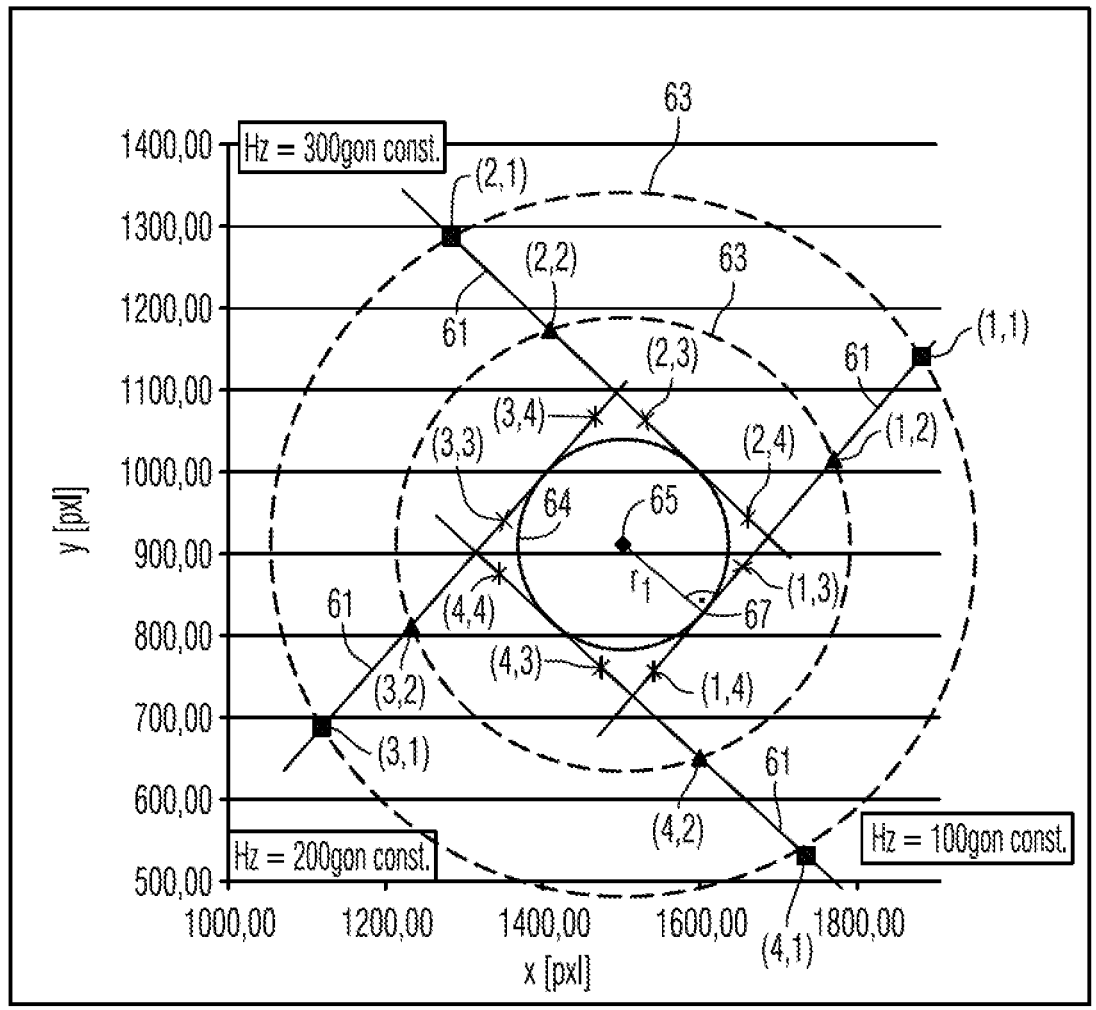
FIG. 3 is an illustration of measuring results obtained with the measuring instrument in the configuration shown in FIG. 2.

FIG. 3 is an illustration of measuring results obtained with the calibration system 37 of the surveying instrument shown in FIG. 2. The performing of one measurement includes orienting the alidade 7 to a given rotational position about the first axis 9, orienting the measuring instrument 11 to a given rotational position relative to the alidade 7 about the second axis 13, reading a detected image from the detector 41, determining the position of the incident light beam within the read image, and recording the light position data corresponding to the determined position. Thus, one measurement is characterized by two rotational positions and the light position data associated with these two rotational positions.

The two rotational positions can be represented as a pair in which the first element indicates the given rotational position of the alidade 7 about the first axis 9, and the second element indicates the given rotational position of the measuring instrument 7 about the second axis 13.

The measurement results illustrated in FIG. 3 are arranged in groups or sets of measurements, wherein each set includes measurements performed at the same given rotational positions of the alidade 7 about the first axis 9 but different rotational positions of the measuring instrument 11 about the second axis 13 and, similarly, sets including measurements performed at different rotational positions of the alidade 7 about the first axis 9 but the same rotational positions of the measuring instrument 11 about the second axis 13.

FIG. 3 shows location data representing locations of incidence of the light beam on the detector 41 in a two-dimensional coordinate system. In the illustrated embodiment, the coordinate system is selected such that the abscissa indicates pixel locations in an x-direction of the detector 41, and the ordinate indicates pixel locations in a y-direction of the detector 41. Symbols having shapes of a rectangle, a triangle, a cross and a star indicate measured positions of the light beam on the detector 47 at given rotational positions. The measurements are each labeled by a pair of numbers wherein the first number indicates the rotational position of the alidade 7 about the first axis 9 and the second number indicates the rotational position of the measuring instrument 11 about the second axis 13.

FIG. 3 shows a set of sixteen measurements performed at four different rotational positions of the alidade 7 about the first axis 9 and four different positions of the measuring instrument 11 about the second axis 13. It is apparent from FIG. 3 that the light positions of measurements performed at the same given rotational position of the alidade 7 about the first axis 9, but different rotational positions of the measuring instrument 11 about the second axis 13, are substantially arranged along straight lines 61 in the coordinate system of the detector 41. It is further apparent from FIG. 3 that the light positions on the detector 41 of measurements performed at different given rotational positions of the alidade 7 about the first axis 9 but the same rotational position of the measuring instrument 11 about the second axis 13 are substantially arranged on concentric circles 63 having a same center 65.

It is apparent from FIG. 3, that a change of the rotational position of the measuring instrument 11 about the second axis 13 from a rotational position corresponding to an encoder reading of 99.0999 gon at measurement (1,1) to a rotational position corresponding to an encoder reading of 99.2999 gon at measurement (1,2) results in a smaller circle 63. Similarly, a change of the rotational position of the measuring instrument 11 about the second axis 13 from the measurement (1,2) to a rotational position corresponding to an encoder reading of 99.4999 gon at measurement (1,3) results again in a smaller circle. However, a similar change of the rotational position of the measuring instrument 11 about the second axis 13 from measurement (1,3) to a rotational position corresponding to an encoder reading of 99.6999 gon at measurement (1,4) results in a circle 63 of a greater diameter. This means that there exists a smallest achievable circle 64 at a rotational position of the measuring instrument 11 about the second axis 13 somewhere between the encoder readings of 99.4999 gon and 99.6999 gon. This position is indicated by reference numeral 67 in FIG. 3. The line 61 is a tangent to this smallest circle 64 having a radius r1. A straight line through the center 65 and the position 67 is orthogonal to the line 61. Positions on the line 61 can be represented using the encoder readings as a parameter.

The rotational position of the measuring instrument 11 about the second axis 13 corresponding to this position 67 can be obtained by fitting a straight line to the light positions determined in a set of measurements ((1,1), (1,2), (1,3) and (1,4); (2,1), (2,2), (2,3) and (2,4); (3,1), (3,2), (3,3) and (3,4); or (4,1), (4,2), (4,3) and (4,4) in FIG. 3) performed at the same rotational positions of the alidade 7 about the first axis 9 and different rotational positions of the measuring instrument 11 about the second axis 13. The position 67 can then be determined by finding that position on the determined line 61 which comes closest to the common center 65 of the circles 63. The center 65 can be determined by fitting a circle to light positions of each set of measurements of the plural sets of measurements ((1,1), (2,1), (3,1) and (4,1); (1,2), (2,2), (3,2) and (4,2); (1,3), (2,3), (3,3) and (4,3); and (1,4), (2,4), (3,4) and (4,4) in FIG. 3) performed at different given rotational positions of the alidade 7 about the first axis 9 and same given rotational positions of the measuring instrument 11 about the second axis 13.

In the illustrated example, the center of each circle is determined by fitting a circle to the light positions of four measurements. However, the number of measured light positions can be three or greater than four. Moreover, the center of a circle can be determined based on two measured light positions if the surveying instrument includes a sufficiently accurate angle measuring instrument to measure the orientation of the alidade 7 relative to the base 3 about the first axis 9. A first measurement can be performed at a first orientation of the alidade 7 relative to the base 3. Thereafter, the alidade 7 is rotated about the first axis 9 by 180° as measured by the angle measuring instrument, and a second measurement is performed in this position. The center of the circle is located half-way between the light positions of the first and second measurements.

While the radius r1 can be determined as the distance between the center 65 of the circles 63 and the closest point 67, it is also possible to calculate the radius r1 of the smallest circle 64 by determining the distance between the straight line 61 fitted to the light positions of measurements (1,1), . . . (1,4) and the straight line 61 fitted to the light positions of the measurements (3,1), . . . (3,4). In order to determine the position of the circle center 65, a set of measurements is required which includes a set of at least two measurements performed at the same given rotational position of the optical measuring instrument 11 about the second axis 13 but different given rotational positions of the alidade 7 about the first axis 9. In order to determine a straight line 61 and the position 67 closest to the center 65, a set of measurements comprising at least two measurements performed at the same given rotational positions of the alidade 7 about the first axis 9 but different given rotational positions of the optical measuring instrument 11 about the second axis 13.

The smallest radius r1 and the rotational position of the measuring instrument 11 about the second axis 13 corresponding to the closest position 67 on line 61 can be used to determine at least one error of the surveying instrument 1 as will be illustrated further below.

Figure 4:
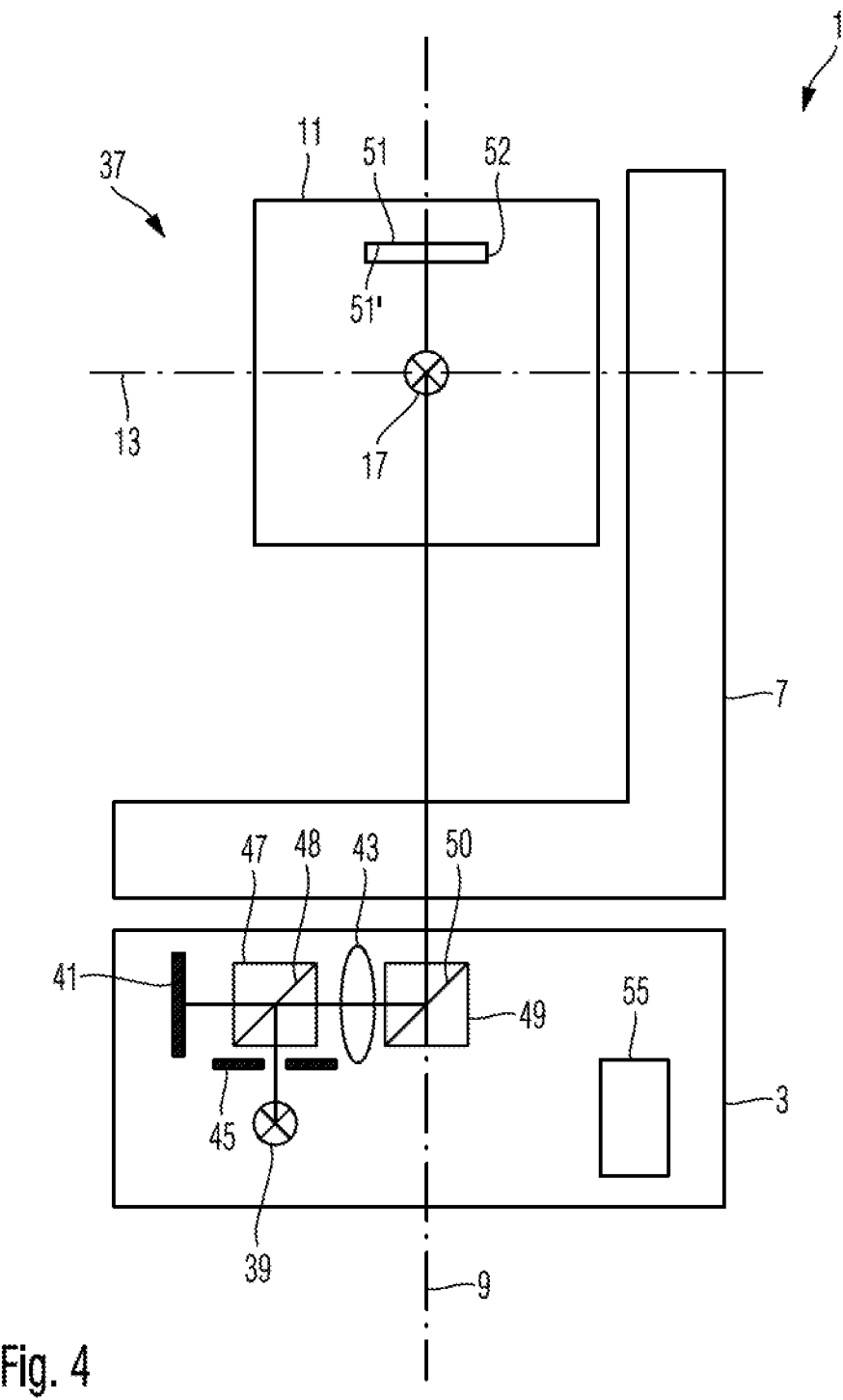
FIG. 4 schematically illustrates the surveying instrument shown in FIG. 2, wherein the optical measuring instrument is in a second orientation relative to the alidade.

FIG. 4 shows the surveying instrument 1 of FIG. 2 wherein, compared to FIG. 2, the optical measuring instrument 11 has been rotated relative to the alidade about the second axis 13 by an angle of about 180° corresponding to 200 gon. The surveying instrument 1 is configured such that the beam path of the calibration system 37 between the light source 39 and the detector 41 exists also for a range of rotational positions around this rotational position of the optical measuring instrument 11 about the second axis 13. This can be achieved, for example, by providing the optical measuring instrument 11 with openings in its casing and its remaining components such that a through hole is formed in which the mirror 52 is arranged such that the light beam can be incident on the reflective surfaces 51 and 51' of the mirror 52 from opposite sides. In the situation shown in FIG. 4, the light beam is reflected from the reflective surface 51' while it is reflected from the other reflective surface 51 in the situation shown in FIG. 2. Herein, the mirror 52 is advantageously arranged on the optical measuring instrument 11 such that it does not interfere with the function provided by the optical measuring instrument 11. For example, the mirror 52 can be arranged outside of the beam path of the telescope 35 of the measuring instrument 11. Moreover, it is possible to provide the reflective surfaces 50 and 51' on separate carriers rather than on a same side of a same plate.

This beam path also traverses components of the alidade 7 and the base 3. This can be achieved, for example, by providing rotational bearings and a shaft connecting the alidade 7 to the base 3 with through holes extending in the axial direction and traversed by the beam path of the light beam. Such bearings and shafts are not illustrated in the figures for simplicity reasons.

A set of sixteen measurements is performed using the calibration system 37 also for this configuration of its beam path. The sixteen measurements are performed for four different rotational positions of the optical measuring instrument 11 about the second axis 13 and four different rotational positions of the alidade 7 about the first axis 9. The positions of incidence of the light beam on the detector 41 obtained from these measurements are illustrated in FIG. 5 showing these positions in the coordinate system of the detector 41 corresponding to FIG. 3.

Figure 5:
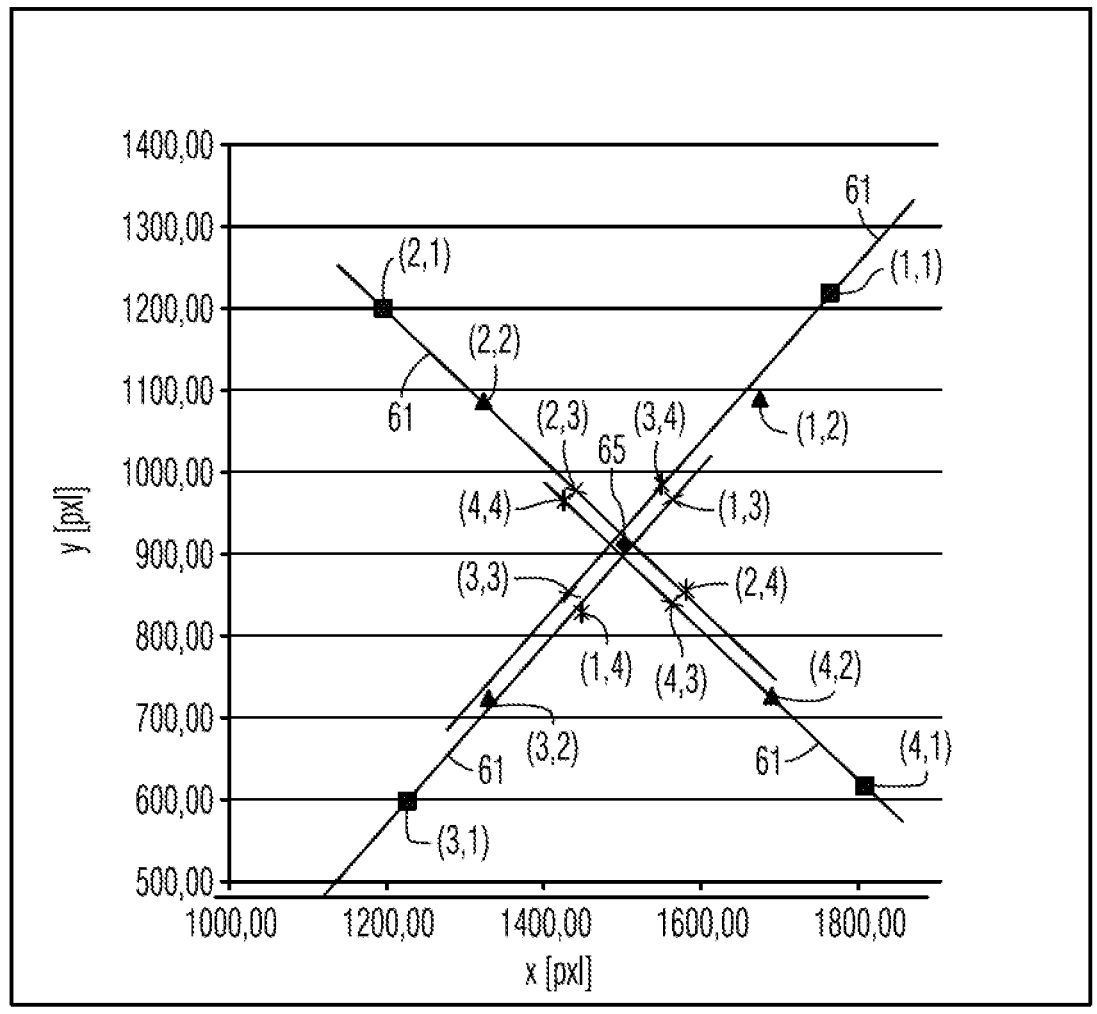
FIG. 5 is an illustration of measuring results obtained with the measuring instrument in the configuration shown in FIG. 4.

It is apparent from FIG. 5 that light positions obtained from measurements performed at the same rotational positions of the alidade 7 about the first axis 9 but different rotational positions of the optical measuring instrument 11 about the second axis 13 are also arranged on straight lines 61 shown in FIG. 5, similar to FIG. 3. Moreover, light positions obtained from measurements performed at different orientations of the alidade 7 about the first axis 9 but the same orientations of the optical instrument 11 about the second axis 13 are arranged on circles having a common center 65, similar to FIG. 3.

It is now possible to determine the smallest possible circle (64 in FIG. 3) and the rotational position of the optical measuring instrument 11 about the second axis 13 were the straight lines 61 are closest to the center 65 (corresponding to position 67 in FIG. 3) also for the position data shown in FIG. 5 and obtained with the configuration of the beam path of the calibration system 37 as shown in FIG. 4.

It is apparent from FIG. 5 that the minimal circle arranged between pairs of parallel lines 61 about the center 65 has a radius r2 which is much smaller than the radius r1 derived from the measuring results shown in FIG. 3.

This difference between the radii r1 and r2 can be explained as follows: In a surveying instrument 1 having an ideal configuration in which the second axis 13 is exactly orthogonal to the first axis 9 and in which the flat mirror surface 51 is exactly parallel to the second axis 13, the radius of the minimal circle 64 can be zero because the optical measuring instrument 11 can be rotated about the second axis 13 to a rotational position in which the portion of the beam path extending between the beam splitter 49 fixed to the base 3 and the mirror 52 fixed to the optical measuring instrument 11 and the portion of the beam path extending between the mirror 52 and the beam splitter 49 are both exactly parallel to the first axis 9. The beam is then incident on the detector at a position corresponding to the center 65 of all circles.

In practice, the surveying instrument 1 differs from this ideal configuration in that the second axis 13 is not exactly orthogonal to the first axis 9 and in that the flat mirror surface 51 is not exactly parallel to the second axis 13. Both deviations contribute to the minimum radii r1 and r2 of the circles 64 illustrated above. The first deviation, which is the deviation of the angle between the first and second axes 9 and 13, respectively, from 90°, is the trunnion axis error k of the surveying instrument 1. The second deviation, which is the deviation of the orientation of the mirror surface 51 from parallel to the second axis 13, can be referred to as a "collimation error" cx of the mirror 52.

Since the orientation of the mirror 52 has been changed by substantially 180° between the configurations shown in FIGS. 2 and 4 and since the mirror 52 is fixed to the measuring instrument 11, the contribution of the deviation of the orientation of the mirror surface 51 to the radii r1 and r2 of the minimal circles 64 has a same absolute value but opposite signs for the two configurations shown in FIGS. 2 and 4. On the other hand, the contribution of the deviation of the angle between the first and second axes 9 and 13 from orthogonal is the same in both configurations.

Two minimal radii r1 and r2 can be determined from the two sets of measurements obtained at the two different rotational configurations of the optical measuring instrument 11 about the second axis 13. The radii r1 and r2 can be expressed as follows:

$$r1 = k + cx, \text{ and} \quad (1)$$

$$r2 = k - cx. \quad (2)$$

The two radii r1 and r2 can be used to calculate the two unknowns which are the trunnion axis error k of the surveying instrument 1 and the collimation error cx of the mirror 52 as follows:

$$k = 0.5(r1 + r2), \text{ and} \quad (3)$$

$$cx = 0.5(r1 r2). \quad (4)$$

The values r1, r2, k and cx in formulas (1) to (4) can be determined in length units, such as millimeters or number of pixels on the detector. The values of k and cx can be translated to angular values better representing the trunnion axis error and the collimation error when the correspondence between positions on the detector and rotational positions about the first and second axes is known. This correspondence can be determined by a suitable calibration of rotational sensors associated with the first axis 9 and the second axis 13, for example.

While the collimation error cx of the mirror 52 is of no relevance for the performance of the surveying instrument, the trunnion axis error k determined based on the two sets of measurements illustrated above is important information relating to the performance of the surveying instrument 1 and can be used to correct measurements performed using the surveying instrument 1.

Figure 6:
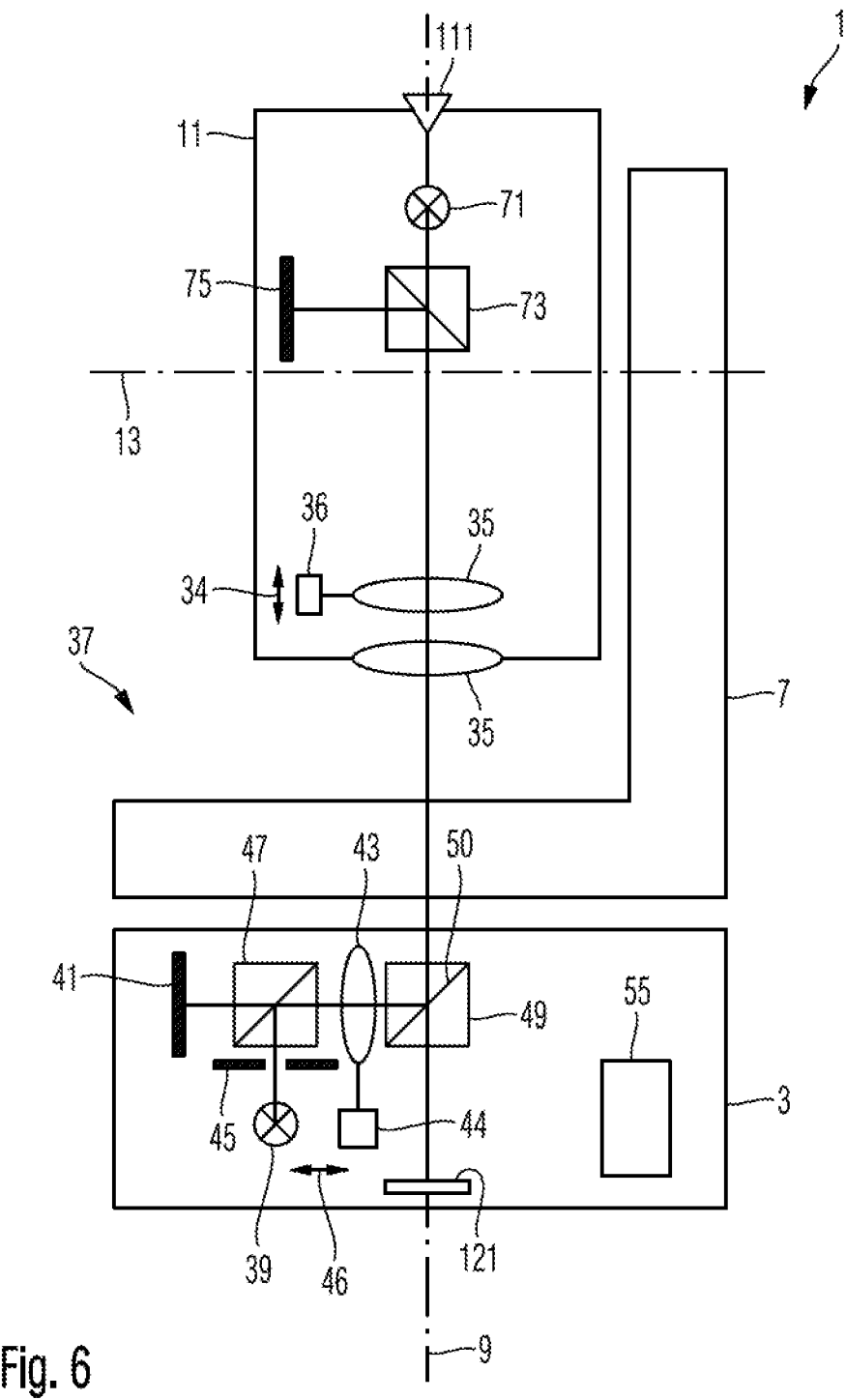
FIG. 6 schematically illustrates the surveying instrument shown in FIGS. 2 and 4, wherein the optical measuring instrument is in a third orientation relative to the alidade.

FIG. 6 shows the surveying instrument 1 shown in FIGS. 2 and 4 in a third configuration.

Specifically, the optical measuring instrument 11 shown in FIG. 6 is in a third orientation relative to the alidade 7 about the second axis 13 which is different from the orientations shown in FIGS. 2 and 4. In this orientation, the measuring axis 17 is orientated substantially parallel to the first axis 9.

FIG. 6 shows further details of the optical measuring instrument 11. Specifically, the optical measuring instrument 11 comprises a measuring light source 71 emitting a measuring light beam which traverses a beam splitter 73 and is collimated and further shaped by optics not shown in FIG.

6. The measuring light beam is emitted from the optical measuring instrument 11 through a front lens 35. In a surveying situation, the light beam emitted from the optical measuring instrument 11 is directed to an object of interest, and light reflected back from the object of interest is received through the front lens 35 and directed onto a detector 75 by the beam splitter 73. The detector can be of a type suitable for performing the function of the surveying instrument 11. For example, the detector 75 can be configured to determine a time when a light pulse is received back from the object of interest to determine the distance of the object of interest from the measuring instrument 11 if the surveying instrument 11 is an electronic distance meter, or the detector 75 can be a position sensitive detector if the surveying instrument 11 is a total station.

The mirror 52 arranged in the beam path of the calibration system 37 in FIGS. 2 and 4 does not interfere with the measuring beam path of the optical measuring instrument 11.

The light source 71 of the optical measuring instrument 11 is also a part of the calibration system 37 in the configuration shown in FIG. 6. Specifically, light of the measuring light source 71 is detected by the detector 41. For this purpose a beam path exists between the light source 71 and the detector 41. This beam path comprises a portion extending from the measuring light source 71 which is fixed to the optical measuring instrument 11, to the beam splitter 49 which is fixed to the base 3, and a portion extending from the beam splitter 49 to the detector 41.

Figure 7:
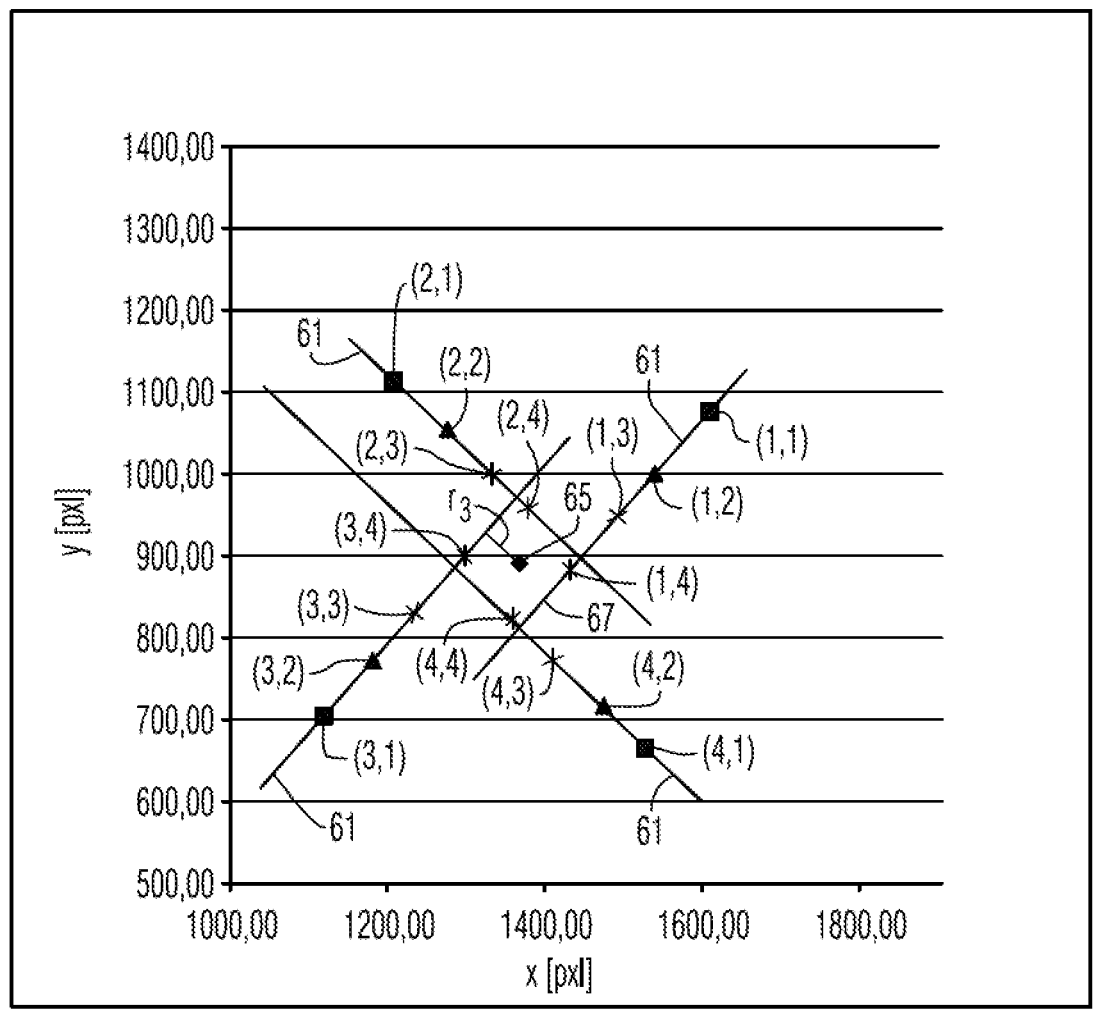
FIG. 7 is an illustration of measuring results obtained with the measuring instrument in the configuration shown in FIG. 6.

A set of sixteen measurements is performed using the calibration system 37 in the configuration shown in FIG. 6. Again, the sixteen measurements are performed at four different rotational positions of the optical measuring instrument 11 about the second axis 13 and four different rotational positions of the alidade 7 about the first axis 9. The positions of incidence of the light beam on the detector 41 obtained from these measurements are illustrated in FIG. 7 showing these positions in the coordinate system of the detector 41 corresponding to FIGS. 3 and 5. It is apparent from FIG. 7 that light positions obtained from measurements performed at the same given rotational positions of the alidade 7 about the first axis 9 but different given rotational positions of the optical measuring instrument 11 about the second axis 13 are also arranged on straight lines 61 shown in FIG. 7, similar to FIGS. 3 and 5. Moreover, light positions obtained from measurements performed at different orientations of the alidade 7 about the first axis 9 but the same orientations of the optical instrument 11 about the second axis 13 are arranged on circles having a common center 65, also similar to FIGS. 3 and 5.

It is again possible to determine the smallest possible circle and the rotational position of the optical measuring instrument 11 about the second axis 13 were the straight lines 61 are closest to the center 65 (corresponding to position 67 in FIG. 3) for the position data shown in FIG. 7 and obtained with the configuration of the beam path of the calibration system 37 as shown in FIG. 6.

It is apparent from FIG. 7 that the minimal circle arranged between pairs of parallel lines 61 about the center 65 has a radius r3 which is different from the radii r1 and r2 obtained previously.

The radius r3 is greater than zero because of deviations of the surveying instrument 1 from its ideal configuration. These deviations mainly include the deviation of the angle between the first and second axes 9 and 13, respectively, from 90°, which is the trunnion axis error k of the surveying instrument 1, and the deviation of the orientation of the measuring axis 17 from the direction orthogonal to the second axis 13, which is the collimation error c of the surveying instrument 1. Both of these deviations contribute to the radius r3 of the minimal circle, which can be written as $$r3 = k + c, \qquad (5)$$

The trunnion axis error k of the surveying instrument 1 has been determined using formula (4) above based on the sets of measurements shown in FIGS. 3 and 5, so that the collimation error c of the surveying instrument 1 can be determined by $$r3 = k \qquad (6)$$

Both the collimation error c of the surveying instrument 1 and the trunnion axis error k are important information relating to the performance of the surveying instrument 1 and can be used to correct measurements performed using the surveying instrument 1.

Figure 8:
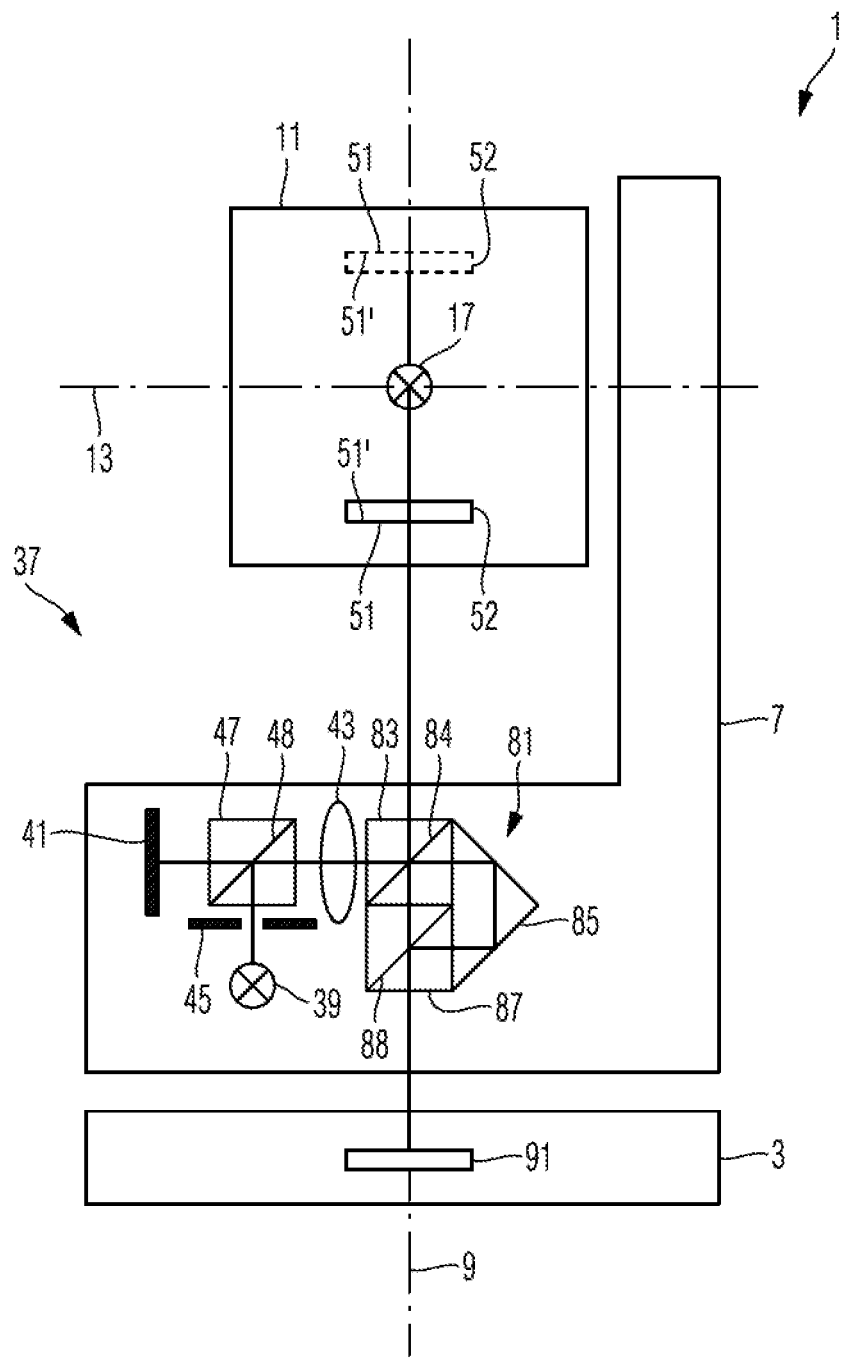
FIG. 8 schematically illustrates a surveying instrument according to a second embodiment.

FIG. 8 schematically illustrates a surveying instrument 1 according to a second embodiment comprising a calibration system 37 which can be used to determine some errors of the surveying instrument 1. The surveying instrument 1 shown in FIG. 8 is similar to the surveying instrument illustrated with reference to FIGS. 2 to 7 in that it comprises a base 3, an alidade 7 rotatable relative to the base 3 about a first axis 9, and an optical measuring instrument 11 rotatable relative to the alidade 7 about a second axis 13. The surveying instrument 1 is also configured to provide a calibration beam path between a light source 39 and a detector 41 for two different ranges of rotational positions of the optical measuring instrument 11 about the second axis 13. The surveying instrument 1 shown in FIG. 8 differs from the surveying instrument illustrated with reference to FIGS. 2 to 7 above in that the light source 39 and the detector 41 of the calibration system 37 are mounted on and fixed to the alidade 7 rather than the base 3. Still, the beam path between the light source 39 and the detector 41 comprises a portion extending between a component fixed to the optical measuring instrument 11 and a component fixed to the base 31.

The light emitted from the light source 39 traverses a pinhole 45 from which it emerges as a thin collimated beam. This beam traverses a beam splitter 47, wherein it is reflected from a semitransparent surface 48 of the beam splitter 47. The light beam then traverses a collimating lens 43 and a beam splitter 83 while traversing a semitransparent surface 84 of the beam splitter 83 and is reflected at two inner surfaces of a prism 85 to enter a beam splitter 87. The light beam is reflected from a semitransparent surface 88 of the beam splitter 87 to be emitted towards a mirror 91 which is fixed to the base 3. The light beam is reflected from the mirror 91 and traverses the beam splitter 87 wherein it is transmitted through the semitransparent surface 88. The light beam then traverses the beam splitter 83 wherein it traverses the semi-transparent surface 84 to be incident on a reflecting surface 51 of a mirror 52 fixed to the measuring instrument 11. Light reflected from the mirror 52 travels back to the beam splitter 83 wherein it is reflected from the semitransparent surface 84 towards the beam splitter 47. The light traverses the collimating lens 43 and the beam splitter 47 and is incident on the detector 41.

Again, a set of plural measurements is performed at different rotational positions of the alidade 7 about the first axis 9 and different rotational positions of the optical measuring instrument 11 about the second axis 13 when the optical measuring instrument 11 is in a configuration in which the mirror 52 is in the lower position shown in full lines in FIG. 8. For example, a set of sixteen measurements can be performed at four different rotational positions of the measuring instrument 11 and for different rotational positions of the alidade 7 such that the corresponding detected light positions on the detector 41 are arranged along straight lines 61 and circles 63 as shown in FIG. 3. A radius r1 of a smallest possible circle 64 can be determined from this set of measurements.

Thereafter, the optical measuring instrument 11 is rotated about the second axis 13 by about 180° such that the mirror 52 is in the upper position shown in broken lines in FIG. 8. The mirror 52 again provides the component of the beam path fixed to the measuring instrument 11.

Again, a set of plural measurements is performed at different rotational positions of the alidade about the first axis and different rotational positions of the optical measuring instrument 11 about the second axis 13 when the optical measuring instrument 11 is in the configuration in which the mirror 52 is in the upper position shown in broken lines in FIG. 8. For example, a set of sixteen measurements can be performed with four different rotational positions of the measuring instrument 11 and for different rotational positions of the alidade 7 such that the corresponding detected light positions on the detector 41 are arranged along straight lines 61 and circles 63 as shown in FIG. 5. A radius r2 of a smallest possible circle 64 can be determined from this set of measurements.

The trunnion axis error k of the surveying instrument 1 can be determined using formulas (3) and (4) above based on the values of r1 and r2 obtained from the two sets of measurements.

The optical measuring instrument 11 is then orientated about the second axis 13 to assume an orientation as shown in FIG. 6 such that the light generated by a measuring light source (not shown in FIG. 8) of the optical measuring instrument 11 is directed downwards along the first axis 9.

This light beam is incident on the beam splitter 83, and a portion of it is reflected from the semitransparent surface 84 of the beam splitter 83 such that it traverses the beam splitter 47 to be incident on the detector.

A set of plural measurements is performed at different rotational positions of the alidade 7 about the first axis 9 and different rotational positions of the optical measuring instrument 11 about the second axis 13 when the optical measuring instrument 11 is in the configuration in which measuring axis 17 is oriented substantially parallel to the first axis 9. For example, a set of sixteen measurements can be performed with four different rotational positions of the measuring instrument 11 and for different rotational positions of the alidade 7 such that the corresponding detected light positions on the detector 41 are arranged along straight lines 61 and circles 63 as shown in FIG. 7. A radius r3 of a smallest possible circle 64 can be determined from this set of measurements.

The collimation error c of the surveying instrument 1 can then be determined using formula (6) based of the determined radius r3 and the previously determined trunnion axis error k of the surveying instrument 1.

Figure 9:
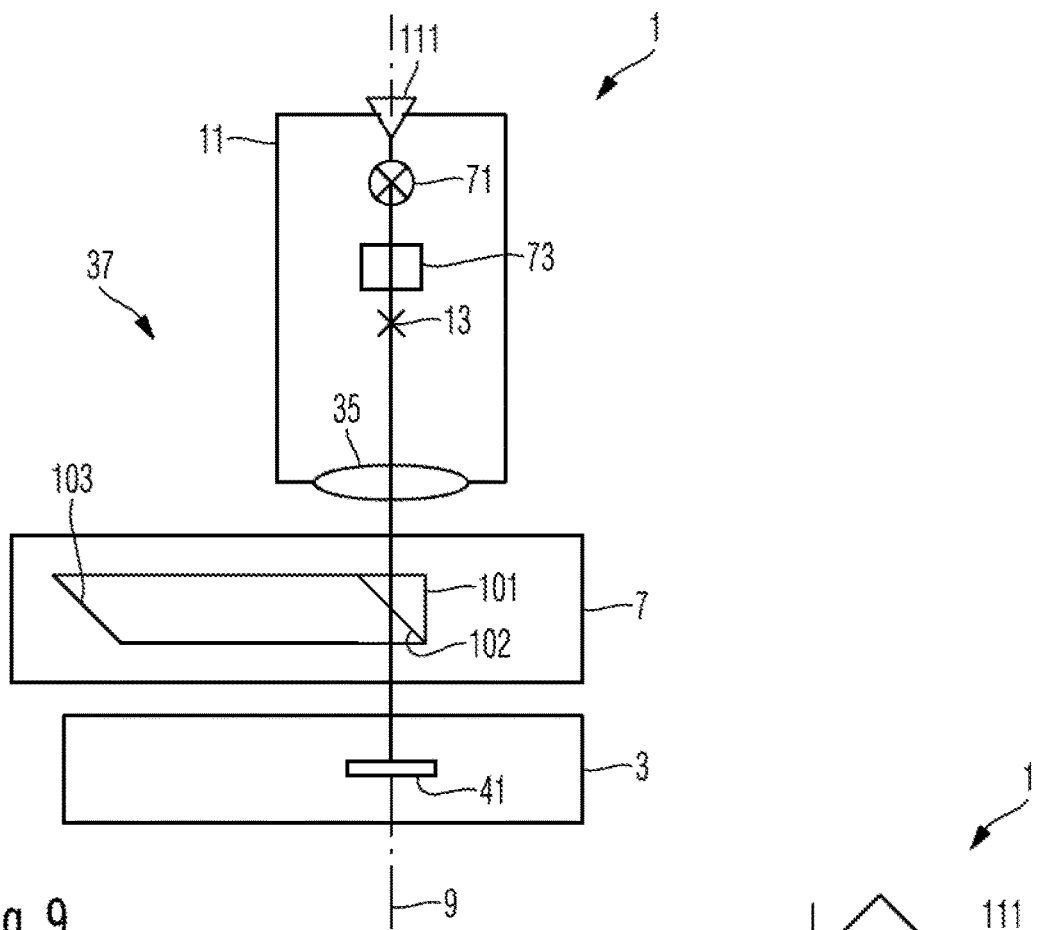
FIG. 9 schematically illustrates a surveying instrument according to a third embodiment in a first orientation of an optical measuring instrument relative to an alidade.

FIG. 9 schematically illustrates a surveying instrument 1 according to a third embodiment comprising a calibration system 37 which can be used to determine some errors of the surveying instrument 1. The surveying instrument 1 shown in FIG. 9 is similar to the surveying instruments illustrated with reference to FIGS. 2 to 8 in that it comprises a base 3, an alidade 7 rotatable relative to the base 3 about a first axis 9, and an optical measuring instrument 11 rotatable relative to the alidade 7 about a second axis 13. The surveying instrument 1 is also configured to provide a calibration beam path having a portion extending between a component fixed to optical measuring instrument 11 and a component fixed to the base 3. This calibration beam path exists for two different ranges of rotational positions of the optical measuring instrument 11 about the second axis 13.

The surveying instrument 1 shown in FIG. 9 differs from the surveying instrument illustrated with reference to FIGS. 2 to 8 above in that a light source 71 of the optical measuring instrument 11 is used to generate the measuring light beam for all measurements and that a separate light source of the calibration system (light source 39 in FIGS. 2, 4, 6 and 8) is not provided.

The optical measuring instrument 11 of the surveying instrument 1 shown in FIG. 9 is oriented such that the measuring axis is oriented substantially parallel to the first axis 9, and measuring light generated by the light source 71 of the optical measuring instrument 11 is directed towards the alidade 7 and base 3. The light beam emitted from a front lens 35 of the optical measuring instrument 11 is incident on a prism 101 having an internal semitransparent surface 102 and a reflecting inner surface 103 arranged at a distance from the semitransparent surface 102. The light beam incident of the prism 101 in FIG. 9 traverses the prism 101 wherein it traverses the semitransparent surface 102 and is incident on a detector 41 fixed to the base 3.

A set of plural measurements is performed at different rotational positions of the alidade about the first axis and different rotational positions of the optical measuring instrument 11 about the second axis 13 when the optical measuring instrument 11 is in the configuration in which the measuring axis 17 is oriented substantially parallel to the first axis 9. For example, a set of sixteen measurements can be performed with four different rotational positions of the measuring instrument 11 about the second axis 13 and four different rotational positions of the alidade 7 about the first axis 9 such that the corresponding detected light positions on the detector 41 are arranged along straight lines and circles, similar to what is shown in FIGS. 3, 5 and 7, for example. A radius r1 of a smallest possible circle 64 can be determined from this set of measurements.

Figure 10:
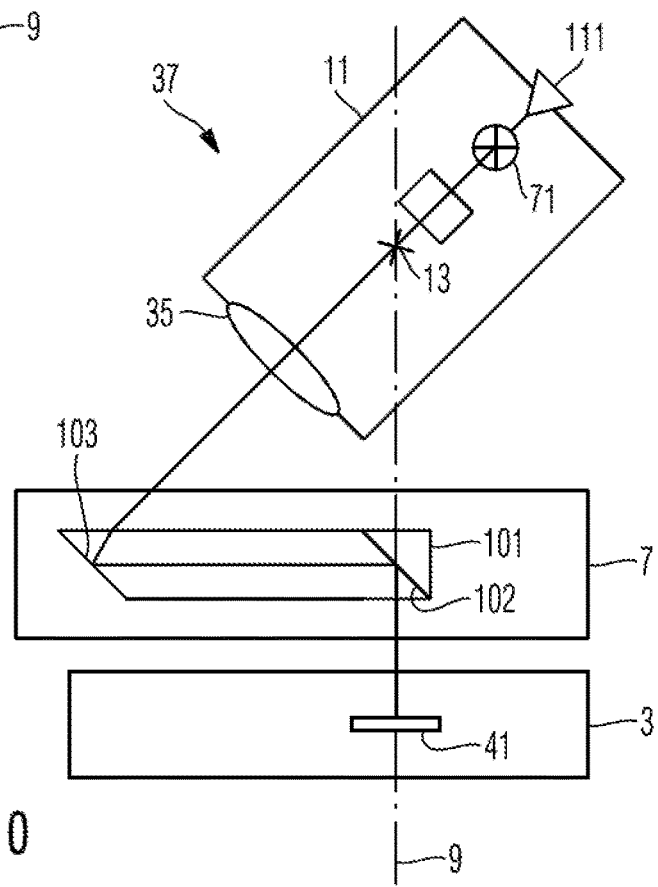
FIG. 10 schematically illustrates the surveying instrument shown in FIG. 9 in a second orientation of an optical measuring instrument relative to the alidade.

Thereafter, the optical measuring instrument 11 of the surveying instrument 1 shown in FIG. 9 is oriented as shown in FIG. 10 where the light beam emitted from the optical measuring instrument 11 is incident on the reflecting inner surface 103 of the prism 101. The reflecting inner surface 103 is oriented such that the light beam reflected from the reflecting inner surface 103 is incident on the semitransparent surface 102 of the prism 101 and reflected therefrom towards the detector 41.

Again, a set of plural measurements is performed at different rotational positions of the alidade 7 about the first axis 9 and different rotational positions of the optical measuring instrument 11 about the second axis 13 when the optical measuring instrument 11 is in the configuration in which measuring axis 17 is oriented transverse to the first axis 9 as shown in FIG. 10. For example, a set of sixteen measurements can be performed with four different rotational positions of the measuring instrument 11 and four different rotational positions of the alidade 7 such that the corresponding detected light positions on the detector 41 are arranged along straight lines 61 and circles 63, similar to what is shown in FIGS. 3, 5 and 7, for example. A radius r2 of a smallest possible circle 64 can be determined from this set of measurements.

The radii r1 and r2 can be advantageously used to determine errors of the surveying system 1. In formulas (1)

and (2) above, r1 and r2 were used to determine the trunnion axis error k of the surveying instrument 1 and the collimation error cx of the mirror 52. It was assumed that the collimation error cx of the mirror 52 entered formulas (1) and (2) with opposite signs since the two rotational positions of the measuring instrument relative to the alidade were opposite positions differing by 180°. In the configurations shown in FIGS. 9 and 10, the measurement is not made against an additional mirror (mirror 52) fixed to the measuring instrument 11 but by using the light source of the measuring instrument 11 itself. Therefore, it is the collimation error c of the surveying system 1 rather the collimation error cx of the mirror 52 which affects the measurements, and this error does contributes to the two sets of measurements with weights which are different from +1 and −1 as in formulas (1) and (2). Accordingly, the radii r1 and r2 for the configurations shown in FIGS. 9 and 10 can be expressed as follows:

$$r1k+c, \text{ and} \tag{7}$$

$$r2k-u^*c \tag{8}$$

wherein a represents u constant associated with the design of the surveying system 1. This constant u covers the difference in the angles of rotation of the measuring instrument 11 about the second axis 13 in the configurations shown in FIGS. 9 and 10 and can be determined in advance for the design of the surveying system 1.

Figure 11:
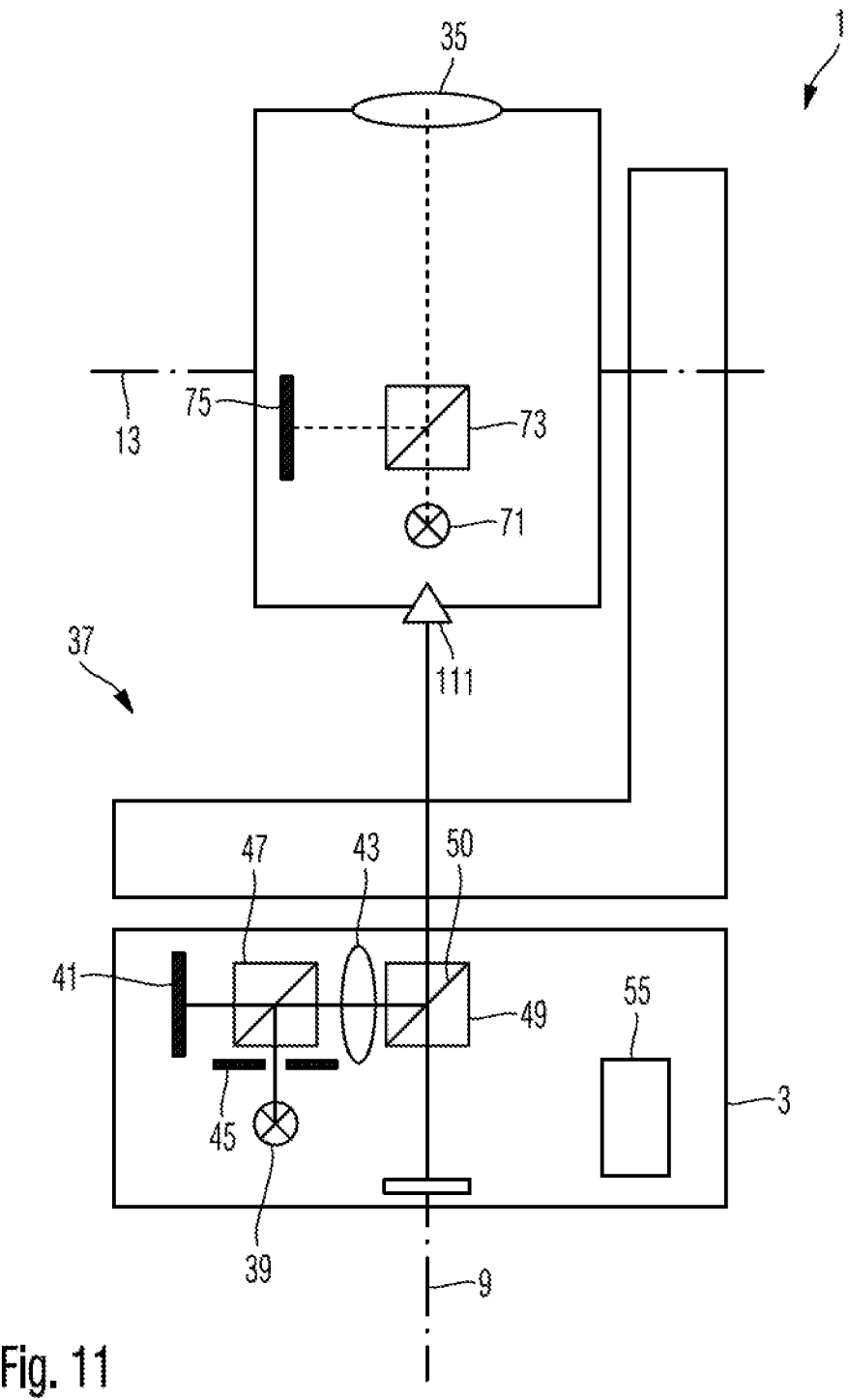
FIG. 11 schematically illustrates the surveying instrument shown in FIGS. 2, 4 and 6, wherein the optical measuring instrument is in a fourth orientation relative to the alidade.

FIG. 11 shows the optical measuring instrument 11 shown in FIGS. 2, 4 and 6 in a fourth orientation about the second axis 13 relative to the alidade 7. In this orientation, the measuring instrument 11 is arranged such that a retroreflector 111 mounted on the measuring instrument 11 is arranged in the beam path of the calibration system 37. The retroreflector 111 is generally an optical element configured such that an incident beam of light is reflected back to its source. Examples of suitable retroreflectors are a retroreflector of the corner type, a retroreflector of the spherical type and a retroreflector of the cat's eye type. The retroreflector 111 can be mounted on the optical measuring instrument 11 at any suitable location such that there exists an orientation of the optical measuring instrument 11 about the second axis 13 relative to the alidade 7 such that a beam path exists between the retroreflector 111 provided on the optical measuring instrument 11 and the light source 39 of the calibration system 37. In the illustrated embodiment, the light source 39 of the calibration system 37 is provided on the base 3, together with the detector 41 of the calibration system 39. In other embodiments, the light source of the calibration system can be mounted on the alidade, such as in the embodiment illustrated with reference to FIG. 8 above, wherein a portion of the beam path of the calibration system 37 extends between a component mounted on the base and a component mounted on the alidade, or a component mounted on the base and the retroreflector 111 mounted on the measuring instrument 11, for example.

Light generated by the light source 39 and emitted from the pinhole 45 is collimated by the lens 43, reflected from the reflecting surface 50 of the beam splitter 49 such that a beam of measuring light is directed towards the retroreflector 111. This beam is inverted in its direction by the retroreflector 111 such that it travels back towards the beam splitter 49, which directs the beam to the lens 43 which focuses the beam on the detector 41. The detection signals of the detector 41 can be evaluated in order to determine light positions indicating the location of incidence of the focused beam on the detector 41.

Due to the nature of the retroreflector 111, which reflects the incident beam in itself, the location of incidence of the focused beam on the detector 41 will not change when the rotational position of the optical measuring instrument 11 about the second axis 13 is changed, as long as the beam is incident on the retroreflector 111. Moreover, the location of incidence of the focused beam on the detector 41 will also not change when the rotational position of the alidade 7 about the first axis 9 is changed.

The location of incidence of the focused beam on the detector 41 is determined by the position of the detector relative to an optical axis of the collimation lens 43. Specifically, the location of incidence of the focused beam on the detector 41 corresponds to the location where the optical axis of the collimation lens 43 intersects the detector 41.

Figure 12:
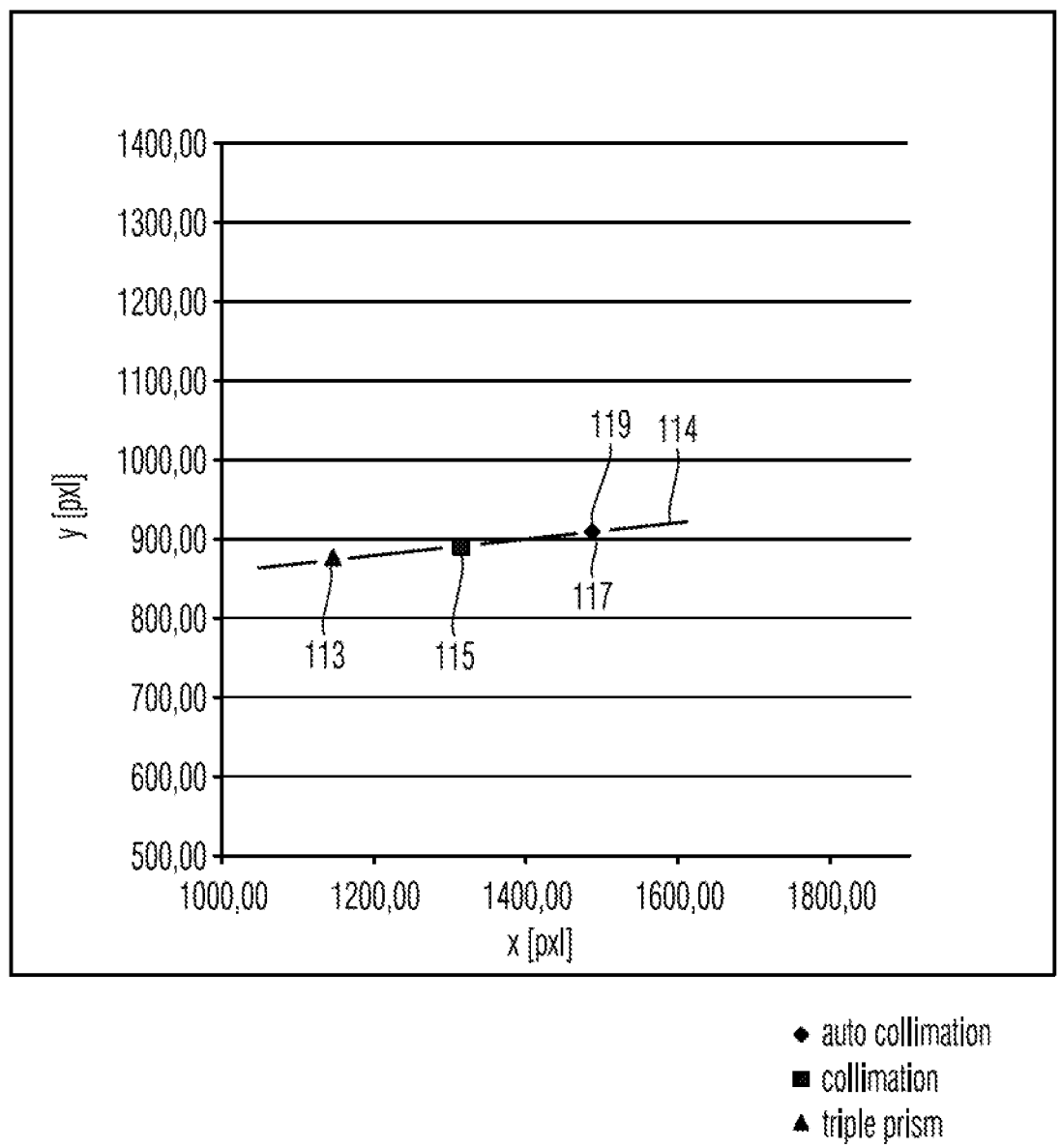
FIG. 12 is an illustration of measuring results obtained with the surveying instrument when performing the methods of calibration.

FIG. 12 shows the location of incidence of the focused beam on the detector 41 in the configuration shown in FIG. 11 in the two-dimensional coordinate system already used in FIGS. 3, 5 and 7 at reference numeral 113.

Reference numeral 115 in FIG. 12 indicates the location of the centers 65 of the circles derived from the measurements illustrated with reference to FIG. 7 above. In these measurements, the surveying instrument 1 is in the configuration shown in FIG. 6 in which the optical measuring instrument 11 is oriented about the second axis 13 such that the beam of light generated by the light source 71 of the optical measuring instrument 11 is focused on the detector 41. In this configuration of the surveying instrument 1, the location of the centers of the circles are determined by an angle between the optical axis of the collimation lens 43 and the first axis 9 of rotation of the alidade 7 about the base 3. In particular, if the components of the surveying instrument 1 were arranged such that the optical axis of the collimation lens 43, after folding by the reflecting surface 50 of the beam splitter 49, exactly coincides with the first axis 9, the locations 113 and 115 would coincide on the detector 41. In practice, however, the optical axis of the collimation lens 43 is arranged at an angle different from zero relative to the first axis 9, resulting in a distance between locations 113 and 115 on the detector 41.

Reference numeral 117 in FIG. 12 indicates the location of the centers 65 of the circles derived from the measurements illustrated with reference to FIG. 3 above. In these measurements, the surveying instrument 1 is in the configuration shown in FIG. 2 in which the optical measuring instrument 11 is oriented about the second axis 13 such that the beam of light generated by the light source 39 and collimated by the collimation lens 43 is focused on the detector 41 subsequent to its reflection from the mirror surface 51 of the mirror 52 mounted on the measuring instrument 11. When the optical axis of the collimation lens 43 is arranged at an angle different from zero relative to the first axis 9, the beam of measuring light will travel under such angle relative to the first axis 9 when the beam is incident on the mirror 52. This angle is multiplied by a factor of two due to the reflection from the mirror surface 51, such that the centers 65 of the circles 63 of the measurements shown in FIG. 3 are arranged at location 117 on a line 114 extending through locations 113 and 115 at twice the distance from location 113 than location 115.

Reference numeral 119 in FIG. 12 indicates the location of the centers 65 of the circles derived from the measurements illustrated with reference to FIG. 5 above. In these measurements, the surveying instrument 1 is in the configuration shown in FIG. 4 in which the optical measuring instrument 11 is oriented about the second axis 13 such that the beam of light generated by the light source 39 and collimated by the collimation lens 43 is focused on the detector 41 subsequent to its reflection from the mirror surface 51' of the mirror 52. Again, the reflection of the beam from the mirror surface 51' has the same effect on the beam as the reflection from the mirror surface 51, such that also the location 119 is arranged on the line 114 at twice the distance from location 113 than location 115, and that the location 119 coincides with location 117.

The measurements illustrated above with respect to FIGS. 3, 5 and 7 are performed to determine the radii r1, r2 and r3 entering into formulas (3), (4) and (6), respectively. As illustrated above, the determining of each of the radii r1, r2, and r3 required the determination of the centers 65 of circles 63. The determination of each circle requires at least 3 measurements performed at different orientations of the alidade 7 about the first axis 9 at a same orientation of the measuring instrument 11 about the second axis 13. Therefore, at least twelve measurements would be required in order to determine the three radii r1, r2 and r3. This process can be time consuming.

However, this process can be simplified when the information shown in FIG. 12 is used. The location 113 can be determined with one single measurement using the reflection from the retroreflector 111. If one of the centers corresponding to locations 115, 117 and 119 is determined by performing three measurements obtained at different orientations of the alidade 7 about the first axis 9 and same orientations of the measuring instrument 11 about the second axis 13, the line 114 is precisely determined. It is then possible to determine the other centers of the circles by exploiting the fact that the locations 117 and 119 coincide and are arranged at twice the distance from location 113 than location 115. Therefore, the number of measurements required to determine the radii r1, r2 and r3 can be significantly reduced.

A further embodiment of a method of calibrating a surveying instrument will be illustrated with reference to FIG. 13 below. This method intends to determine at least one property of a coordinate transformation between a coordinate system of the detector 75 of the optical measuring instrument 11 and a coordinate system of the surveying instrument 1 based on plural measurements.

The plural measurements are performed in the configuration where the optical measuring instrument 11 is in the third orientation illustrated above with reference to FIG. 6. The measurements are performed using the light source 39 of the calibration system 37 for producing a light beam, and the detector 75 of the optical measuring instrument 11 for detecting light of the light beam. The beam path of the light beam extends from the light source 39 fixed to the base 3, is reflected by the beam splitter 49, traverses the objective lens 35 of the optical measuring system 11, is reflected from the beam splitter 73 of the optical measuring instrument 11 and is incident on the detector 75 of the optical measuring instrument 11.

The objective lens 35 may include a telescope comprising plural lens elements and an actuator 36 for displacing at least one of the plural lens elements in a direction indicated by an arrow 34 in FIG. 6. The actuator 36 can be controlled by the controller 55 in order to change a focal length of the objective lens 35. For any given setting of the focal length, the actuator 44 of the calibration system 37 can be controlled to adjust the collimation of the beam generated from light source 39 such that this beam generates a well-defined beam spot on the detector 75.

FIG. 6 further shows a mirror 121 provided on the base to establish a beam path from the light source 71 of the optical measuring instrument 11 via the mirror 121 to the detector 75 of the optical measuring instrument 11. Moreover, a beam path can also be established between the light source 71 the optical measuring instrument 11 to the detector 41 of the calibration system 37.

Figure 13:
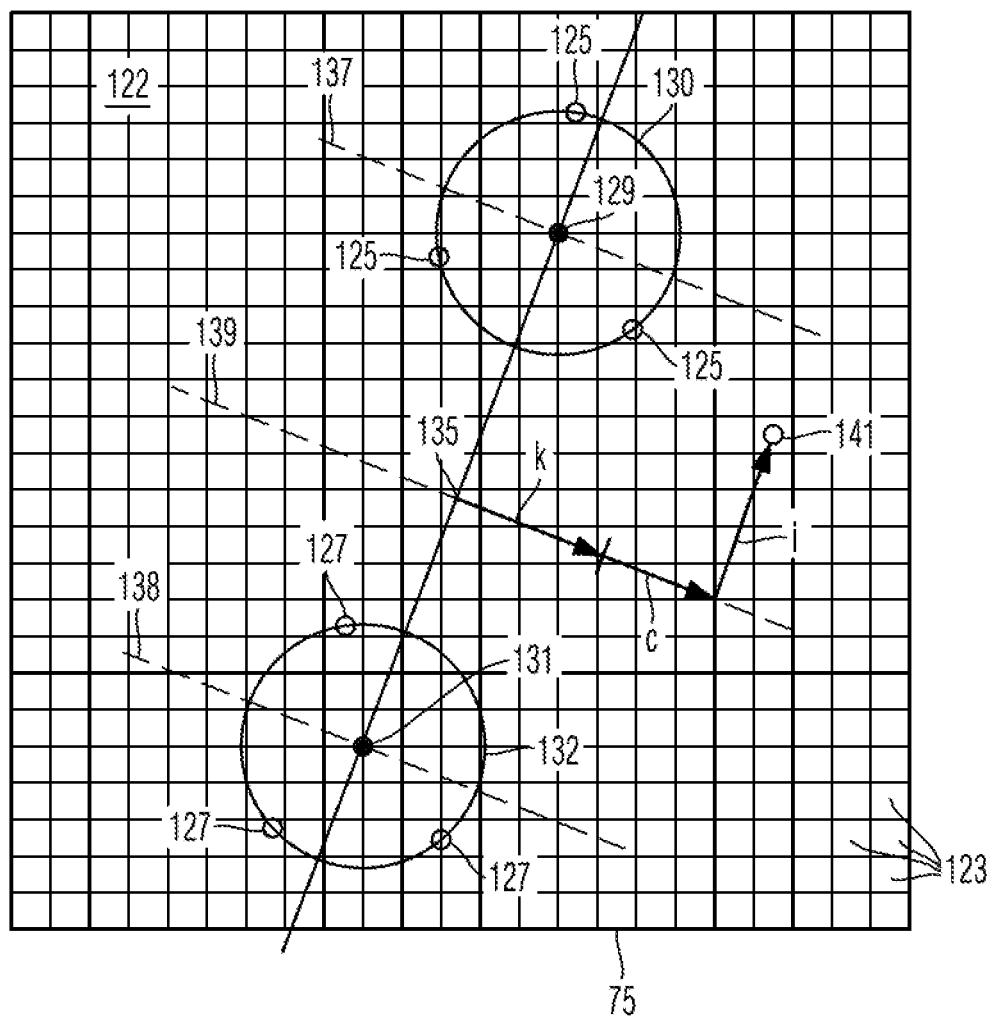
FIG. 13 is an illustration of detector of an optical measuring instrument of the surveying instrument shown in FIGS. 2, 4, 6, 8, 9, 10 and 11 for illustrating a method of determining a property of a coordinate transformation between a coordinate system of the detector and a coordinate system of the surveying instrument

FIG. 13 is an illustration of a detection surface 122 of the detector 75 of the optical measuring instrument 11. The detection surface 122 includes an array of pixels 123.

In the measurements, the beam path exists between the light source 39 of the calibration system 37 and the detector 75 of the optical measuring instrument 11 achieved in a configuration as shown in FIG. 6, for example.

A first set of measurements is performed at plural different orientations of the alidade 7 about the first axis 9 and at a same first orientation of the optical measuring instrument 11 about the second axis 13. For example, the orientation of the optical measuring instrument 11 about the second axis 13 can be 199 gon. Reference numerals 125 in FIG. 13 indicate positions on the detection surface 122 determined as the positions of the light beam based on the light intensities detected by the pixels 123 of the detector 75 in plural measurements of the first set of measurements.

Thereafter, the orientation of the optical measuring instrument 11 about the second axis 13 is changed to a second orientation. The second orientation can be 201 gon, for example. A second set of measurements is performed where the second orientation of the optical measuring instrument 11 about the second axis 13 is maintained constant while the orientation of the alidade 7 about the first axis 9 is changed between the measurements. Reference numerals 127 in FIG. 13 indicate positions on the detection surface 122 determined as the positions of the light beam based on the light intensities detected by the pixels 123 of the detector 75 in the second set of measurements.

Additional sets of measurements can be performed at additional constant orientations of the measuring instrument about the axis 13 and different orientations of the alidade 7 about the second axis 9.

Reference numeral 129 in FIG. 13 indicates a center of a circle 130 fitted through the plural positions 125. Similarly, reference numeral 131 in FIG. 13 indicates a center of a circle 132 fitted through the plural positions 127.

Reference numeral 135 in FIG. 13 indicates a line fitted through the plural centers 129 and 131 of the circles 130 and 132, respectively. The line 135 represents those locations on the detection surface 122 of the detector 75 where the first axis 9 intersects the detection surface. Herein, the intersection of the first axis 9 with the detection surface 122 is to be understood such that the first axis 9 is folded by the beam splitter 73 as it were a light beam.

Different positions on the line 135 correspond to different orientations of the optical measuring instrument 11 about the second axis 13 at a constant orientation of the alidade about the first axis 9. Reference numeral 137 in FIG. 13 illustrates a line orthogonal to line 135 and intersecting center 129, and reference numeral 138 in FIG. 13 illustrates a line orthogonal to line 135 and intersecting center 131. In the illustrated example, the line 137 is at the orientation of 199 gon of the optical measuring instrument 11 about the second axis 13, while the line 138 is at the orientation of 201 gon of the optical measuring instrument 11 about the second axis 13.

Reference numeral 139 in FIG. 13 represents a line at the orientation of 200 gon of the optical measuring instrument 11 about the second axis 13 which can be determined by interpolation based on the lines 137 and 138. The lines 135 and 139 can be used as the abscissa and ordinate of a suitable coordinate system of the surveying instrument 1. Specifically, when the optical measuring instrument 11 is pointing to a distant object carrying lines which are vertically oriented, these lines are imaged onto lines on the detection surface 122 which are parallel to line 135. Similarly, when this object carries horizontal lines, these lines are imaged onto lines on the detection surface 122 which are parallel to line 139.

A suitable coordinate of the detector 75 is oriented according to the two arrangement directions of the pixels 123 of the array of pixels of the detector 75. It is apparent that a transformation from the coordinate system of the detector 75 to the coordinate system of the surveying instrument can be determined based on the information obtained from the plural sets of measurements illustrated above.

FIG. 13 further shows a vector k oriented parallel to line 139 and attached to the point of intersection of lines 135 and 139. The length of the vector k is determined based on the trunnion axis error k determined as illustrated above. The trunnion axis error is determined in angular units. A scale to be used for transforming angular units to distances on the detector can be determined, for example based on the distance between lines 137 and 138 on the detector, since these lines correspond to known orientations of the optical measuring instrument 11, such as 199 gon and 201 gon in the illustrated example.

FIG. 13 further shows a vector c oriented parallel to line 139 and attached to the head of vector k. The length of the vector c is determined based on the collimation error c determined as illustrated above. The length of the sum of the vectors k and c corresponds to the sum of the trunnion axis error and the collimation error.

FIG. 13 further shows a vector i oriented parallel to line 135 and attached to the head of vector c. The length of the vector i is determined based on the vertical index error i determined as illustrated above.

A point 141 at the head of vector i in FIG. 13 represents a location on the detection surface 122 of the detector 75 onto which a particular location of the object is imaged. This particular location is the location of the distant object onto which the measuring light beam is directed. The pixels or the pixel positioned around this point 141 are also referred to as the center pixel or center pixels of the detector 75.

The procedure illustrated above can be repeated for plural settings of the focal length the objective lens 35 of the measuring instrument 11 by adjusting the position of the lens 43 of the calibration system 37 using the actuator 43 correspondingly. Therefore, the center pixel of the detector 75 can be determined in dependence of the focal length of the objective lens 35 of the measuring instrument 11. The center pixel may change when the focal length is changed due to possible limitations in the accuracy of the movements of the lens elements of the objective lens 35.

The principles of the embodiments illustrated above can be applied to other types of surveying instruments, such as theodolites, tachymeters, total stations, scanners, laser range finders and dumpy levels, for example.

Additional information relating to scanners having a rotatable mirror for orienting the measuring axis in various directions can be found in the co-pending patent application of the present applicant titled "SURVEYING SYSTEM AND ROTATING MIRROR FOR A SURVEYING SYSTEM" which is filed on the same day as the present application (attorney reference T13844-EP), wherein the whole disclosure of this patent application is incorporated herein by reference.

Summarized, the present application discloses a surveying instrument comprising a base; an alidade rotatable about a first axis relative to the base; and an optical measuring instrument having a measuring axis rotatable about a second axis relative to the alidade. A beam path can be provided for a light beam using components including a light source, lenses, mirrors, beam splitters, and a position-sensitive detector. The surveying can be calibrated by performing plural measurements at different orientations of the alidade relative to the base and different orientations of the measuring instrument relative to the alidade using the above components.

The present application in particular discloses the following combinations of features:

1. A method of calibrating a surveying instrument, wherein the surveying instrument comprises a base; an alidade rotatable about a first axis relative to the base; and an optical measuring instrument having a measuring axis rotatable about a second axis relative to the alidade; wherein the method comprises: providing a beam path for a light beam using components including a light source for emitting the light beam, zero or more lenses for collimating the light beam, zero or more mirrors for folding the beam path, zero or more beam splitters, and a position-sensitive detector for detecting light of the light beam, wherein the light source is fixed to one of the base, the alidade and the optical measuring instrument, wherein the detector is fixed to one of the base, the alidade and the optical measuring instrument, wherein at least a portion of the beam path extends between one of the components fixed to the base and one of the components fixed to the optical measuring instrument, and wherein the beam path exists for at least a first range of rotational positions of the optical measuring instrument about the second axis; performing plural measurements; and determining at least one error of the surveying instrument based on the plural measurements; wherein each measurement includes detecting, using the detector, light of the light beam traveling from the light source along the beam path to the detector when the alidade is in a given rotational position about the first axis and the optical instrument is in a given rotational position about the second axis.

2. The method according to combination 1, wherein a first set of measurements comprises at least three measurements performed at at least two different pairs of given rotational positions of the alidade about the first axis and given rotational positions within the first range of the optical measuring instrument about the second axis.

3. The method according to combination 2, wherein the at least two different pairs of given rotational positions of the alidade about the first axis and given rotational positions of the optical measuring instrument about the second axis of the first set of measurements comprise at least two pairs having a same given rotational position of the optical measuring instrument about the second axis but different given rotational positions of the alidade about the first axis, and at least two pairs having a same given rotational position of the alidade about the first axis but different given rotational positions of the optical measuring instrument about the second axis.

4. The method according to combination 3, wherein the different given rotational positions of the alidade about the first axis of the at least two pairs differ by more than $\pi/10$, in particular more than $\pi/2$.

5. The method according to combinations 2 to 4, wherein the detecting of the light of the light beam includes determining light position data representing a position on the detector based on the detected light of the light beam; wherein the determining of the at least one error comprises calculating center data representing a position on the detector of a circle extending through the positions represented by the light position data determined based on the measurements at the at least two pairs of given rotational positions.

6. The method combination to combination 5, further comprising determining line data representing a mathematical straight line on the detector extending through the positions represented by the light position data determined based on the measurements at the at least two pairs of given rotational positions.

7. The method according to combination 6, further comprising determining an encoder reading of a rotational encoder for measuring the rotational position of the optical measuring instrument about the second axis, wherein the encoder reading is determined at each of the at least two different rotational positions of the at least two pairs of given rotational positions, parameterizing the line data using the encoder readings; calculating, based on the parameterization of the line data, an encoder reading corresponding to a position on the straight line represented by the line data at which the line is closest to the center of the circle represented by the center data.

8. The method according to combination 7, wherein the at least one error is determined based on the calculated encoder reading.

9. The method according to combinations 1 to 8, wherein the determined at least one error includes a vertical index error of the surveying instrument.

10. The method according to combinations 1 to 9, wherein the beam path exists for a second range of rotational positions of the optical measuring instrument about the second axis, wherein the second range is different from the first range; and wherein the method further comprises performing a second set of measurements; and determining at least one error of the surveying instrument based on the second set of measurements; wherein the second set of measurements comprises at least two measurements performed at at least two different pairs of given rotational positions of the alidade about the first axis and given rotational positions within the second range of the optical measuring instrument about the second axis.

11. The method according to combination 10, wherein a center of the second range of rotational positions of the optical measuring instrument about the second axis differs from a center of the first range of rotational positions of the optical measuring instrument about the second axis by more than $\pi/10$, in particular more than $\pi/2$.

12. The method according to combinations 10 and 11, wherein the at least two different pairs of given rotational positions of the alidade about the first axis and given rotational positions of the optical measuring instrument about the second axis of the second set of measurements comprise at least two pairs having a same given rotational position of the optical measuring instrument about the second axis but different given rotational positions of the alidade about the first axis, and at least two pairs having a same given rotational position of the alidade about the first axis but different given rotational positions of the optical measuring instrument about the second axis.

13. The method according to combination 12, wherein the different given rotational positions of the alidade about the first axis of the at least two pairs differ by more than $\pi/10$, in particular more than $\pi/2$.

14. The method according to combinations 10 to 13, wherein the detecting of the light of the light beam includes determining light position data representing a position on the detector based on the detected light of the light beam; wherein the determining of the at least one error comprises calculating first and second radius data representing a radius of a circles extending through the positions represented by the light position data determined based on the measurements at the at least two pairs having the different given rotational positions of the alidade about the second axis of the second measurement, respectively.

15. The method according to combination 14, wherein the determining of the at least one error comprises calculating a linear combination of the first and second radius data, and wherein the determining of the at least one error in particular comprises calculating at least one of a difference between the first and second radius data and a sum of the first and second radius data.

16. The method according to combinations 1 to 15, wherein the determined at least one error includes a trunnion axis error of the surveying instrument.

17. The method according to combinations 1 to 16, wherein the light source is fixed to the optical measuring instrument.

18. The method according to combination 17, wherein the light source is a measuring light source of the optical measuring instrument emitting the light beam along the measuring axis.

19. The method according to combination 18, wherein the determined at least one error includes a collimation error of the surveying instrument.

20. The method according to combinations 18 and 19, wherein the optical measuring instrument comprises a telescope having a variable focal length; and wherein the method further comprises determining the at least one error of the surveying instrument for each setting of plural different settings of the focal length of the telescope.

21. The method according to combinations 18 to 20, wherein the detector is a detector of the optical measuring instrument; wherein the method comprises performing plural measurements at different rotational positions of the alidade about the first axis and plural rotational positions of the optical measuring instrument about the second axis, wherein, in each of the plural measurements, the optical measuring instrument is oriented such that the light beam emitted from the optical measuring instrument is reflected from a mirror fixed to the base and incident on the detector of the optical measuring instrument; and determining at least one property of a coordinate transformation between a coordinate system of the detector and a coordinate system of the surveying instrument based on the plural measurements.

22. The method according to combination 21, wherein the at least one property of the coordinate transformation between a coordinate system of the detector and the coordinate system of the surveying instrument includes information representing a position in the coordinate system of the detector corresponding to a position in an image of an object recorded using the detector where the beam emitted from the optical measuring instrument is incident on the object.

23. The method according to combination 18, wherein the light source is different from a measuring light source of the optical measuring instrument emitting the light beam along the measuring axis.

24. The method according to combinations 1 to 23, wherein the components include a mirror and a beam splitter fixed to the alidade and arranged at a distance from each other.

25. The method according to combination 24, wherein the beam path existing in the first range of rotational positions of the optical measuring instrument about the second axis is reflected from the mirror and traverses the beam splitter, wherein the beam path existing in the second range of rotational positions of the optical measuring instrument about the second axis is not reflected from the mirror and traverses the beam splitter.

26. The method according to combination 1 to 25, wherein the detecting of the light of the light beam includes determining light position data representing a position on the detector based on the detected light of the light beam.

27. The method according to combination 26, wherein the represented position on the detector is a position of a center of the light beam incident on the detector.

28. The method according to combination 27, wherein the center of the light beam incident on the detector is a center of gravity of light intensity of the light beam incident on the detector.

29. The method according to combinations 1 to 28, wherein the light source is fixed to one of the base and the alidade.

30. The method according to combination 29, wherein the components include first and second mirrors fixed to the optical measuring instrument.

31. The method according to combination 30, wherein the first and second mirrors are provided by opposite flat surfaces of a reflective layer provided on a transparent plate fixed to the optical measuring instrument.

32. The method according to combinations 1 to 31, wherein the detector is fixed to one of the base and the alidade.

33. The method according to combination 32, wherein the components include a beam splitter, and wherein the light source, the detector and the beam splitter are fixed to one of the base and the alidade.

34. The method according to combinations 1 to 33, further comprising performing a measurement along the measuring axis using the measuring instrument when the alidade is at a given rotational position about the first axis and the optical instrument is at a given rotational position about the second axis; measuring the rotational position of the optical instrument about the second axis; measuring the rotational position of the alidade about the first axis; correcting the measured rotational position of the optical instrument about the second axis and the measured rotational position of the alidade about the first axis based on the determined error of the surveying instrument; associating the measurement performed using the optical instrument with the corrected rotational position of the optical instrument about the second axis and the corrected rotational position of the alidade about the first axis.

35. A method of calibrating a surveying instrument, in particular in combination with the method according to combinations 1 to 34, wherein the surveying instrument comprises a base; an alidade rotatable about a first axis relative to the base; and an optical measuring instrument rotatable about a second axis relative to the alidade; wherein the optical measuring instrument is configured to emit a beam of measuring light along a measuring axis of the optical measuring instrument; wherein the optical measuring instrument comprises a position-sensitive detector and optics to image a distant object onto the detector; wherein the method comprises performing plural measurements at different rotational positions of the alidade about the first axis and plural rotational positions of the optical measuring instrument about the second axis, wherein, in each of the plural measurements, the optical measuring instrument is oriented such that the beam of measuring light is reflected from a mirror fixed to the base and incident on the detector; and determining at least one property of a coordinate transformation between a coordinate system of the detector and a coordinate system of the surveying instrument based on the plural measurements.

36. The method according to combination 35, wherein the at least one property of the coordinate transformation between a coordinate system of the detector and the coordinate system of the surveying instrument includes data representing a position on the detector onto which a location of the distant object is imaged where the measuring light beam is incident on the distant object.

37. The method according to combinations 35 and 36, wherein the performing of the plural measurements comprises determining of light position data representing a position on the detector based on the detected light of the measuring light beam.

38. The method according to combination 37, wherein the determining at the least one property of the coordinate transformation comprises determining center data representing a position on the detector of a circle extending through positions represented by the light position data determined based on plural measurements performed at different rotational positions of the alidade about the first axis and same rotational positions of the optical measuring instrument about the second axis.

39. The method according to combination 38, wherein the determining at the least one property of the coordinate transformation comprises determining line data representing a mathematical straight line extending through positions represented by plural center data obtained at different rotational positions of the optical measuring instrument about the second axis.

40. The method according to combinations 35 to 39, wherein the determining of the at least one property of the coordinate transformation is further based on data representing at least one of a vertical index error of the surveying instrument, a trunnion axis error of the surveying instrument, and a collimation error of the surveying instrument.

41. A surveying instrument, comprising a base; an alidade rotatable about a first axis relative to the base; an optical measuring instrument having a measuring axis rotatable about a second axis relative to the alidade; wherein the surveying instrument is configured to provide a beam path for a light beam provided by components including a light source for emitting light of the light beam, zero or more lenses for collimating the light beam, zero or more mirrors for folding the beam path, zero or more beam splitters, and a position-sensitive detector for detecting the light of the light beam, wherein the light source is fixed to one of the base, the alidade and the optical measuring instrument, wherein the detector is fixed to one of the base, the alidade and the optical measuring instrument, wherein at least a portion of the beam path extends between one of the components fixed to the base and one of the components fixed to the optical measuring instrument; and wherein this beam path exists for at least a first rotational position of the optical measuring instrument about the second axis and a second rotational position of the optical measuring instrument about the second axis which is different from the first rotational position.

42. The surveying instrument according to combination 41, wherein the optical measuring instrument comprises a measuring light source configured to emit a measuring light beam along the measuring axis.

43. The surveying instrument according to combinations 41 and 42, wherein the optical measuring instrument comprises a telescope; wherein the telescope comprises at least two lenses and a first actuator; wherein the first actuator is configured to change a distance between the at least two lenses along the measuring axis, in particular for changing a focal length of the telescope;

and wherein the beam path is provided by the measuring light source and a detector fixed to the alidade or the base.

44. The surveying instrument according to combination 43, wherein the beam path is further provided by a lens mounted on the alidade and the base, respectively, wherein the surveying instrument further comprises a second actuator configured to change a distance of the lens from the detector.

45. A surveying instrument, in particular in combination with the surveying instrument according to combinations 41 to 44, wherein the surveying instrument comprises a base; an alidade rotatable about a first axis relative to the base; and an optical measuring instrument rotatable about a second axis relative to the alidade; wherein the optical measuring instrument is configured to emit a beam of measuring light along a measuring axis of the optical measuring instrument; wherein the optical measuring instrument comprises a position-sensitive detector and optics to image a distant object onto the detector; wherein the surveying instrument comprises a mirror fixed to the base; and wherein the optical measuring instrument can be oriented such that the beam of measuring light is reflected from the mirror fixed to the base such that it is incident on the detector of the optical measuring instrument.

46. A surveying instrument, in particular in combination with the surveying instrument according to combinations 41 to 45, wherein the surveying instrument comprises a base; an alidade rotatable about a first axis relative to the base; and an optical measuring instrument rotatable about a second axis relative to the alidade; a light source for emitting a light beam mounted on the base or the alidade; a mirror mounted on the optical measuring instrument; and a detector for detecting the light beam emitted by the light source and mounted on the base or the alidade; wherein there exist two opposite orientations of the optical measuring instrument about the second axis such that the light beam emitted from the light source is incident on the mirror and that the light beam reflected from the mirror is incident on the detector.

47. The surveying instrument according to combination 46, wherein the mirror has two reflecting surfaces.

48. The surveying instrument according to combinations 46 and 47, wherein the mirror includes a glass plate carrying a reflecting layer.

Some embodiments have been described in connection with the accompanying drawing. However, it should be understood that the figure is not drawn to scale. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

For purposes of this disclosure, certain aspects, advantages, and novel features are described herein. It is to be understood that not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to the examples described in the present specification or during the prosecution of the application, which examples are to be construed as non-exclusive. Further, the actions of the disclosed processes and methods may be modified in any manner, including by reordering actions and/or inserting additional actions and/or deleting actions. It is intended, therefore, that the specification and examples be considered as illustrative only, with a true scope and spirit being indicated by the claims and their full scope of equivalents.

The invention claimed is:

1. A method of calibrating a surveying instrument, wherein the surveying instrument comprises:
    a base;
    an alidade rotatable about a first axis relative to the base; and
    an optical measuring instrument having a measuring axis rotatable about a second axis relative to the alidade;
wherein the method comprises:
    providing a beam path for a light beam using components including a light source for emitting the light beam, zero or more lenses for collimating the light beam, zero or more mirrors for folding the beam path, zero or more beam splitters, and a position-sensitive detector for detecting light of the light beam, wherein the light source is fixed to one of the base, the alidade and the optical measuring instrument, wherein the detector is fixed to one of the base, the alidade and the optical measuring instrument, wherein at least one of the components is fixed to the base, and at least a portion of the beam path extends between one of the components fixed to the base and one of the components fixed to the optical measuring instrument, and wherein the beam path exists for at least a first range of rotational positions of the optical measuring instrument about the second axis;
    performing plural measurements; and
    determining at least one error of the surveying instrument based on the plural measurements;
    wherein each measurement includes detecting, using the detector, light of the light beam traveling from the light source along the beam path to the detector when the alidade is in a given rotational position about the first axis and the optical instrument is in a given rotational position about the second axis, wherein the detecting of the light of the light beam includes determining light position data representing a position on the detector based on the detected light of the light beam, and
    wherein the represented position on the detector is a position of a center of the light beam incident on the detector.

2. The method according to claim 1,
wherein a first set of measurements comprises at least three measurements performed at at least two different pairs of given rotational positions of the alidade about the first axis and given rotational positions within the first range of the optical measuring instrument about the second axis.

3. The method according to claim 2,
wherein the detecting of the light of the light beam includes determining light position data representing a position on the detector based on the detected light of the light beam;
wherein the determining of the at least one error comprises calculating center data representing a position on the detector of a circle extending through the positions represented by the light position data determined based on the measurements at the at least two pairs of given rotational positions.

4. The method according to claim 3,
further comprising determining line data representing a mathematical straight line on the detector extending through the positions represented by the light position data determined based on the measurements at the at least two pairs of given rotational positions; and
further comprising determining an encoder reading of a rotational encoder for measuring the rotational position of the optical measuring instrument about the second axis,
wherein the encoder reading is determined at each of the at least two different rotational positions of the at least two pairs of given rotational positions, parameterizing the line data using the encoder readings; calculating, based on the parameterization of the line data, an encoder reading corresponding to a position on the straight line represented by the line data at which the line is closest to the center of the circle represented by the center data;
wherein the at least one error is determined based on the calculated encoder reading.

5. The method according to claim 2,
wherein the at least two different pairs of given rotational positions of the alidade about the first axis and given rotational positions of the optical measuring instrument about the second axis of the first set of measurements comprise at least two pairs having a same given rotational position of the optical measuring instrument about the second axis but different given rotational positions of the alidade about the first axis, and at least two pairs having a same given rotational position of the alidade about the first axis but different given rotational positions of the optical measuring instrument about the second axis.

6. The method according to claim 5,
wherein the different given rotational positions of the alidade about the first axis of the at least two pairs differ by at least one of more than $\pi/10$ or more than $\pi/2$.

7. The method according to claim 1,
wherein the beam path exists for a second range of rotational positions of the optical measuring instrument about the second axis, wherein the second range is different from the first range; and
wherein the method further comprises:
performing a second set of measurements; and
determining at least one error of the surveying instrument based on the second set of measurements;
wherein the second set of measurements comprises at least three measurements performed at at least two different pairs of given rotational positions of the alidade about the first axis and given rotational positions within the second range of the optical measuring instrument about the second axis.

8. The method according to claim 7,
wherein the at least two different pairs of given rotational positions of the alidade about the first axis and given rotational positions of the optical measuring instrument about the second axis of the second set of measurements comprise at least two pairs having a same given rotational position of the optical measuring instrument about the second axis but different given rotational positions of the alidade about the first axis, and at least two pairs having a same given rotational position of the alidade about the first axis but different given rotational positions of the optical measuring instrument about the second axis.

9. The method according to claim 7,
wherein the detecting of the light of the light beam includes determining light position data representing a position on the detector based on the detected light of the light beam;
wherein the determining of the at least one error comprises calculating first and second radius data representing a radius of a circles extending through the positions represented by the light position data determined based on the measurements at the at least two pairs having the different given rotational positions of the alidade about the second axis of the second measurement, respectively;
wherein the determining of the at least one error comprises calculating a linear combination of the first and second radius data, and wherein the determining of the at least one error in particular comprises calculating at least one of a difference between the first and second radius data and a sum of the first and second radius data.

10. The method according to claim 1,
wherein the light source is fixed to one of the base and the alidade.

11. The method according to claim 10,
wherein the components include first and second mirrors fixed to the optical measuring instrument.

12. The method according to claim 11,
wherein the first and second mirrors are provided by opposite flat surfaces of a reflective layer provided on a transparent plate fixed to the optical measuring instrument.

13. A method of calibrating a surveying instrument, in particular in combination with the method according to claim 1,
wherein the surveying instrument comprises:
a base;
an alidade rotatable about a first axis relative to the base; and
an optical measuring instrument rotatable about a second axis relative to the alidade;
wherein the optical measuring instrument is configured to emit a beam of measuring light along a measuring axis of the optical measuring instrument;
wherein the optical measuring instrument comprises a position-sensitive detector and optics to image a distant object onto the detector;
wherein the method comprises:
performing plural measurements at different rotational positions of the alidade about the first axis and plural rotational positions of the optical measuring instrument about the second axis, wherein, in each of the plural measurements, the optical measuring instrument is oriented such that the beam of measuring light is produced by a light source fixed to the base and incident on the detector; and determining at least one property of a coordinate transformation between a coordinate system of the detector and a coordinate system of the surveying instrument based on the plural measurements.

14. The method according to claim 1,
wherein the determined at least one error includes a vertical index error of the surveying instrument, or
wherein the determined at least one error includes a trunnion axis error of the surveying instrument.

15. The method according to claim 1,
wherein the light source is fixed to the optical measuring instrument;
wherein the light source is a measuring light source of the optical measuring instrument emitting the light beam along the measuring axis;
wherein the determined at least one error includes a collimation error of the surveying instrument;
wherein the optical measuring instrument comprises a telescope having a variable focal length; and wherein the method further comprises determining the at least one error of the surveying instrument for each setting of plural different settings of the focal length of the telescope.

16. The method according to claim 15,
wherein the detector is a detector of the optical measuring instrument;
wherein the method comprises:
   performing plural measurements at different rotational positions of the alidade about the first axis and plural rotational positions of the optical measuring instrument about the second axis, wherein, in each of the plural measurements, the optical measuring instrument is oriented such that the light beam emitted from the optical measuring instrument is reflected from a mirror fixed to the base and incident on the detector of the optical measuring instrument; and
   determining at least one property of a coordinate transformation between a coordinate system of the detector and a coordinate system of the surveying instrument based on the plural measurements;
wherein the at least one property of the coordinate transformation between a coordinate system of the detector and the coordinate system of the surveying instrument includes information representing a position in the coordinate system of the detector corresponding to a position in an image of an object recorded using the detector where the beam emitted from the optical measuring instrument is incident on the object.

17. The method according to claim 1,
wherein the components include a mirror and a beam splitter fixed to the alidade and arranged at a distance from each other;
wherein the beam path existing in the first range of rotational positions of the optical measuring instrument about the second axis is reflected from the mirror and traverses the beam splitter, wherein the beam path existing in the second range of rotational positions of the optical measuring instrument about the second axis is not reflected from the mirror and traverses the beam splitter.

18. The method according to claim 1,
wherein the center of the light beam incident on the detector is a center of gravity of light intensity of the light beam incident on the detector.

19. A method of calibrating a surveying instrument,
wherein the surveying instrument comprises:
   a base;
   an alidade rotatable about a first axis relative to the base; and
   an optical measuring instrument having a measuring axis rotatable about a second axis relative to the alidade;
wherein the method comprises:
   providing a beam path for a light beam using components including a light source for emitting the light beam, zero or more lenses for collimating the light beam, zero or more mirrors for folding the beam path, zero or more beam splitters, and a position-sensitive detector for detecting light of the light beam, wherein the light source is fixed to one of the base, the alidade and the optical measuring instrument, wherein the detector is fixed to one of the base, the alidade and the optical measuring instrument, wherein at least one of the components is fixed to the base, and at least a portion of the beam path extends between one of the components fixed to the base and one of the components fixed to the optical measuring instrument, and wherein the beam path exists for at least a first range of rotational positions of the optical measuring instrument about the second axis;
   performing plural measurements;
   performing a measurement along the measuring axis using the measuring instrument when the alidade is at a given rotational position about the first axis and the optical instrument is at a given rotational position about the second axis;
   measuring the rotational position of the optical instrument about the second axis;
   measuring the rotational position of the alidade about the first axis;
   determining at least one error of the surveying instrument based on the plural measurements;
   correcting the measured rotational position of the optical instrument about the second axis and the measured rotational position of the alidade about the first axis based on the determined error of the surveying instrument; and
   associating the measurement performed using the optical instrument with the corrected rotational position of the optical instrument about the second axis and the corrected rotational position of the alidade about the first axis;
   wherein each measurement includes detecting, using the detector, light of the light beam traveling from the light source along the beam path to the detector when the alidade is in a given rotational position about the first axis and the optical instrument is in a given rotational position about the second axis.

20. A method of calibrating a surveying instrument,
wherein the surveying instrument comprises:
   a base;
   an alidade rotatable about a first axis relative to the base; and
   an optical measuring instrument having a measuring axis rotatable about a second axis relative to the alidade;
wherein the method comprises:
   providing a beam path for a light beam using components including a light source for emitting the light beam, zero or more lenses for collimating the light beam, zero or more mirrors for folding the beam path, zero or more beam splitters, and a position-sensitive detector for detecting light of the light beam, wherein the light source is fixed to one of the base, the alidade and the optical measuring instrument, wherein the detector is fixed to one of the base and the alidade, wherein at least one of the components is fixed to the base, and at least a portion of the beam path extends between one of the components fixed to the base and one of the components fixed to the optical measuring instrument, and wherein the beam path exists for at least a first range of rotational positions of the optical measuring instrument about the second axis;

performing plural measurements; and determining at least one error of the surveying instrument based on the plural measurements;

wherein each measurement includes detecting, using the detector, light of the light beam traveling from the light source along the beam path to the detector when the alidade is in a given rotational position about the first axis and the optical instrument is in a given rotational position about the second axis.

21. The method according to claim 20, wherein the components include a beam splitter, and wherein the light source, the detector and the beam splitter are fixed to one of the base and the alidade.

* * * * *